United States Patent
Lopez De Arroyabe et al.

(10) Patent No.: US 8,391,903 B2
(45) Date of Patent: Mar. 5, 2013

(54) INITIALIZATION METHOD AND OPERATING METHOD FOR A WIRELESS NETWORK

(75) Inventors: Jose Lopez De Arroyabe, Munich (DE); Frank Schmidt, Altkirchen (DE); Wolfgang Heller, Kirchheim (DE); Frank Berghald, Munich (DE); Markus Brehler, Baierbrunn (DE)

(73) Assignee: Enocean GmbH, Oberhaching (DE)

( * ) Notice: Subject to any disclaimer, the term of this patent is extended or adjusted under 35 U.S.C. 154(b) by 341 days.

(21) Appl. No.: 12/497,526

(22) Filed: Jul. 2, 2009

(65) Prior Publication Data

US 2010/0087217 A1    Apr. 8, 2010

(30) Foreign Application Priority Data

Jul. 2, 2008  (DE) .................... 10 2008 031 407

(51) Int. Cl.
  *H04B 7/00* (2006.01)
(52) U.S. Cl. ......... 455/509; 455/450; 455/451; 455/517
(58) Field of Classification Search .............. 455/509, 455/450, 68, 517, 445, 422.1, 436, 569.1, 455/205, 423; 370/338, 254, 400, 350, 252, 370/328, 208, 392; 375/259; 345/418
  See application file for complete search history.

(56) References Cited

U.S. PATENT DOCUMENTS

| | | | |
|---|---|---|---|
| 5,748,100 A * | 5/1998 | Gutman et al. | 340/7.22 |
| 7,391,135 B2 | 6/2008 | Schmidt | |
| 7,692,532 B2 * | 4/2010 | Fischer et al. | 340/10.2 |
| 2003/0020707 A1 * | 1/2003 | Kangas et al. | 345/418 |
| 2003/0099221 A1 * | 5/2003 | Rhee | 370/338 |
| 2003/0109270 A1 * | 6/2003 | Shorty | 455/517 |
| 2005/0035600 A1 | 2/2005 | Albsmeier et al. | |
| 2006/0002368 A1 | 1/2006 | Budampati et al. | |
| 2006/0063522 A1 * | 3/2006 | McFarland | 455/423 |

(Continued)

FOREIGN PATENT DOCUMENTS

| | | |
|---|---|---|
| DE | 101 25 059 | 12/2002 |
| DE | 20 2004 000 730 | 4/2004 |

(Continued)

OTHER PUBLICATIONS

Perkins, C. et al., "Ad hoc On-Demand Distance Vector (AODV) Routing", RFCfc, 3561, Jul. 2003, URL: http://www.ietf.org/rfc/rfc3561.tx.

(Continued)

*Primary Examiner* — Tan Trinh
(74) *Attorney, Agent, or Firm* — Foley & Lardner LLP; Matthew L. Fenselau

(57) ABSTRACT

An initialization method for a wireless network is disclosed with at least one receiver node and/or switching node and transmitter node in which one transmitter node is allocated to at least one receiver node. An operating method is also disclosed for a wireless network with at least one receiver node and/or switching node and transmitter node. At least one allocation is made between a transmitter node and a receiver node after such an initialization method with the steps of: transmission of a wireless message at the transmitter node, reception of the wireless message at one or more switching nodes, and if the switching node is not the receiver node, transmission of the wireless message at the switching node and reception of the message at the preset receiver node.

23 Claims, 27 Drawing Sheets

U.S. PATENT DOCUMENTS

| | | | |
|---|---|---|---|
| 2006/0091984 A1 | 5/2006 | Schmidt | |
| 2006/0198448 A1* | 9/2006 | Aissi et al. | 375/259 |
| 2007/0160000 A1* | 7/2007 | Dobrowski et al. | 370/328 |
| 2007/0165545 A1* | 7/2007 | Dobrowski et al. | 370/254 |
| 2007/0263872 A1 | 11/2007 | Kirkup et al. | |
| 2007/0272293 A1 | 11/2007 | Schmidt | |
| 2008/0058023 A1* | 3/2008 | Seshadri et al. | 455/569.1 |
| 2008/0070614 A1 | 3/2008 | Ogushi et al. | |
| 2008/0233945 A1* | 9/2008 | Gummadi et al. | 455/422.1 |
| 2009/0104910 A1* | 4/2009 | Lee et al. | 455/436 |
| 2009/0209248 A1* | 8/2009 | Lee et al. | 455/422.1 |
| 2010/0087201 A1* | 4/2010 | Choi et al. | 455/450 |
| 2011/0002320 A1* | 1/2011 | Yuk et al. | 370/338 |
| 2011/0235627 A1* | 9/2011 | Wang | 370/338 |

FOREIGN PATENT DOCUMENTS

| | | |
|---|---|---|
| DE | 102 569 42 | 6/2004 |
| DE | 103 15 764 | 10/2004 |
| DE | 103 15 765 | 11/2004 |
| DE | 10 2006 024 167 | 11/2007 |
| EP | 1 568 096 | 8/2005 |
| WO | WO 2004/051786 | 6/2004 |
| WO | WO 2004/052043 | 6/2004 |

OTHER PUBLICATIONS

Hiraku Okada et al, "A Low-Overhead Handling Scheme of STA Association Information for IEEE 802.11s", IEEE International Symposium on Personal, Indoor and Mobile Radio Communications., PIMRC, IEEE, PI, XX, Sep. 1, 2007, pp. 1-5.

The 802.11 Working Group of the IEEE 802 Committee, "IEEE P802.11s/D1.01 Draft Standard for Information Technology-Telecommunications and Information Exchange between Systems-Local and Metropolitan Area Networks—Specific Requirements—Part 11: Wireless LAN Medium Access Control (MAC) and Physical Layer (PHY) Specifications" IEEE, Piscataway, NJ, USA, Mar. 2007, pp. 1-243.

Abolhasan, Mehran et al.: "A Review of Routing Protocols for Mobile Ad Hoc Networks" www.ElsevierComputerScience.com, Ad Hoc Networks 2, (2004), pp. 1-22.

Biagioni, Edoardo et al,: "A Reliablility Layer for Ad-Hoc Wireless Sensor Network Routing," Proceedings of the 37th Hawaii International Conference on System Sciences—2004, pp. 1-8.

Marina, Mahesh K. et al.: "Ad hoc-on demand multipath distance vector routing" Wireless Communications and Mobile Computing, 2006; 6:969-988.

Royer, Elizabeth M. et al "A Review of Current Routing Protocols for Ad Hoc Mobile Wireless Networks" IEEE Personal Communications, Apr. 1999, pp. 46-55.

Yao, Yong et al.; "The Cougar Approach to In-Network Query Processing in Sensor Networks" SIGMOD Record, vol. 31, No. 3, Sep. 2002, pp. 9-18.

* cited by examiner

INITIALIZATION METHOD AND OPERATING METHOD FOR A WIRELESS NETWORK

RELATED APPLICATION

This application claims priority of German Application No. 10 2008 031 407.2, filed Jul. 2, 2008, the disclosure content of which is hereby incorporated by reference.

FIELD OF THE INVENTION

The invention relates to an initialization method for a wireless network with receiver nodes, transmitter nodes, and switching nodes. The invention further relates to an operating method for a wireless network with receiver nodes, transmitter nodes, and switching nodes.

BACKGROUND OF THE INVENTION

A wireless network is a network in which information is transmitted by means of electromagnetic waves. It is a wireless telecommunications system to which the methods of wireless technology are applied. A wireless network differentiates between transmitter nodes that send out information, switching nodes that forward the information that was sent out from transmitter nodes to other switching nodes and/or to a receiver node, and receiver nodes that are the destination of information sent out from a transmitter node. Each transmitter node is consequently constructed to at least send out wireless messages. Each switching node is constructed to receive wireless messages and to send them out again after reception. Each switching node consequently also satisfies the minimum requirements for a receiver node that is constructed to at least receive wireless messages. A simple variant of a wireless network is consequently composed of at least one transmitter node and one receiver node or one switching node. In practice, wireless networks are composed of several transmitter nodes, switching nodes, or receiver nodes.

Physical limits for the operation of wireless networks are given, for example, by the transmission range of individual transmitter nodes or switching nodes. For example, it is definitely possible that the distance of a transmitter node from a receiver node that is the destination of a message sent out by the transmitter node is greater than the range of the transmitter node. Consequently, such wireless networks are always laid out so that at least one additional receiver or switching node is arranged within the range of a transmitter, receiver, or switching node. In this way, distances can also be traversed that go beyond the range of an individual transmitter or switching node. In such a case, the individual wireless messages are switched from a transmitter node via the reachable switching node to a receiver node. Here, several switching nodes in parallel are burdened with the switching. Thus, the message is forwarded via several randomly formed transmission paths to the receiver.

The switching of wireless messages in the wireless network leads to a high data transfer volume in the wireless network until each message that was sent out by a transmitter node has reached its destination, a switching node or a receiver node.

SUMMARY OF THE INVENTION

One object of the invention is to improve the switching method in a wireless network.

At least one transmitter node is allocated to at least one switching node by an initialization method for a wireless network. The selected switching node is constructed to receive wireless messages and, thus, acts not only as a switching node, but also as a receiver node. At the beginning of the initialization method, the transmitter node is registered on the receiver node or the switching node. For better differentiation from other switching nodes or from other receiver nodes, this switching node is designated below as the destination node. Then, the registration information generated when the transmitter node registered on the destination node is propagated to and via all switching nodes that can be reached in the wireless network. In each switching node, the registration information is stored in a preset memory.

A memory in the sense of the invention is an electronic memory, preferably a non-volatile, electronic memory that is preferably provided in each switching node and receiver node and capable of being provided in each transmitter node.

Initialization is to be understood as a propagation of the registration information in the network and, thus, a propagation of the allocation of the transmitter node to the destination node in the network. Initialization further means making the wireless network ready and, thus, the switching nodes of the wireless network for future wireless messages that are to be switched in the scope of the initialization method, for example, starting from the transmitter node via switching nodes of the wireless network to the destination node.

A transmitter node is composed of at least one means for transmitting wireless messages. Such a transmitter node further includes an identification number with which the transmitter node is uniquely specified at least in the wireless network.

A switching node is composed of at least one means for receiving wireless messages and one additional means for transmitting these wireless messages. A switching node further includes an identification number with which the switching node is uniquely specified in the wireless network. Preferably, the switching node is operated in an energy self-sufficient way with ambient energy. Such switching nodes are coupled with an energy transformer and/or an energy accumulator that is constructed to transform primary energy in the environment of the switching node into electrical energy. Such primary energy is, for example, heat, light, pressure, or other physical parameters. An electromagnetic field from the environment of the switching node could also serve as an energy source for the switching node. Such an energy supply is compiled under the term "Energy Harvesting."

A receiver node is composed of at least one means for receiving wireless messages and one additional means for transmitting, evaluating, and forwarding these wireless messages to another device. For this purpose, the receiver node is coupled or at least could be coupled to the additional device either wirelessly or with wires. Examples for such additional devices are: Switch actuators for lighting systems, switch actuators for shading systems, such as blinds on buildings, central receivers for further processing of the wireless message, switch actuators for air-conditioning systems and heating systems and the like. In addition, a receiver node could also comprise a means for wirelessly forwarding the received wireless messages.

Preferably, a switching node also comprises the means of a receiver node and, consequently, can then be coupled with the additional device. Thus, in the wireless network, one device type could be eliminated, and a wireless network that could be operated with transmitter nodes and switching nodes could be formed.

When the transmitter node is registered on the destination node, the identification number of the transmitter node is transmitted to the destination node. Thus, these two nodes are coupled to each other by means of this allocation information. This produces the advantage that the wireless message that is sent out by the transmitter node must comprise merely the message itself with the identification number of the transmitter node. An additional transmission of the identification number of the destination node is not necessary by the coupling of the destination node to the transmitter node created in the registration process. In this way, it can be achieved with additional advantage that the transmitter node can be used in the wireless network with a unidirectional transmission operation, because a confirmation message on a successful transmission is not necessary. Through the coupling, the destination of each wireless message sent out from the transmitter node is preset.

In addition, another advantage is produced that is shown in the energy supply of the transmitter node. The transmitter node could be constructed for unidirectional operation. That is, the transmitter node comprises merely the means for transmitting wireless messages. Means for receiving a wireless message, for example, a reception confirmation of the destination node, are not necessary. In this way, the operation of the transmitter node could also be limited to the short time period for the transmission of the wireless message. Thus, wireless sensors or wireless switches that are energy self-sufficient could be used as transmitter nodes. Transmitter nodes that are energy self-sufficient have a separate energy supply that is formed from at least one energy transformer and optionally one energy accumulator. The energy transformer transforms action-related energy, for example, movement, or ambient energy, for example, heat, into electrical energy. The transmitter node is operated with the electrical energy generated in this way. Such a transmitter node could then be operated completely independently of another electrical energy source, for example, a battery or a power-supply network.

The transmitter node is registered on the destination node as follows, for example: For registration on the destination node, the transmitter node is brought into the immediate vicinity of the destination node. So that the subsequent registration signal sent out by the transmitter node reaches only the desired destination node or nodes, the emitted transmission power at the transmitter is reduced for this purpose. The transmission power is selected so that only destination nodes located in the immediate surroundings of the transmitter receive the registration signal of the transmitter. In this way, the registration step is initiated only at these destination nodes, and the initialization method is begun. For reducing the transmission power and triggering the registration process at the destination node, the transmitter node comprises suitable means, for example, a push button by means of which the processes that have just been described could be triggered.

Another possibility for registering the transmitter node on the destination node is given by a computer that can be integrated into the network by means of a wireless interface and is constructed to manage wireless communications with each receiver node, switching node, and transmitter node, if the transmitter node also comprises a receiver node, contained in the wireless network. In this way, a registration process for the transmitter node could also be performed with the computer terminal. Preferably, the computer terminal is further constructed to propagate the allocation of the transmitter node to the receiver node in the wireless network and communicate with selected switching nodes.

As an alternative to the two variants described above for registering the transmitter node on the destination node, it is provided to initiate the initialization method on the destination node by means of a button before sending out the registration information. The wireless message then subsequently received by the destination node is evaluated as registration information of the transmitter node and thus forms the allocation information.

A combination of the two variants, reduction of the transmission power at the transmitter node and initiation of the initialization method on the destination node is also possible.

If the destination node has received the registration information, the registration information is linked with the identification number of the destination number, and the allocation information formed in this way is transmitted from the destination node. Thus, the transmitted wireless message comprises the identification number of the transmitter node and the identification number of the destination node and, thus, the allocation information.

In this way, the allocation information is propagated in the wireless network. At each switching node that receives this allocation information, the node switches to an initialization state, and furthermore the allocation information is transmitted and thus forwarded to other switching nodes. This information is sent or transmitted to all switching nodes that can be reached in the wireless network. With the change to the initialization state, the allocation information is also stored in the memory of each switching node.

Preferably, the allocation information is propagated to all switching nodes according to a tree structure that has its root at the destination node. This means that, starting from the destination node, according to a tree structure with increasing branches, the registration information generated for the registration process is propagated to the switching nodes.

The initialization state means that a memory location in the memory at the individual switching and receiver nodes is reserved for the duration of the initialization state and is filled with registration values and transmission values and allocation values between the transmitter, switching, and destination nodes during the initialization state.

After the successful registration process on the destination node, the transmitter node is brought to its set position and there transmits a wireless message on the transmitter node with non-reduced transmission power. This wireless message comprises at least the identification number of the transmitter node and is received by all of the switching nodes of the wireless network within the range of the transmitter node. At each switching node that has received this wireless message, the wireless message is allocated to the destination node by means of the identification number of the transmitter node. Then, the expanded wireless message generated in this way is stored in the memory, and the expanded wireless message is forwarded in connection with the identification number of the forwarding switching node. In this way, at each switching node, it is stored in the memory to which the wireless message is allocated to which destination node and from which switching node each wireless message was received. This process is performed in the network until the wireless message has reached its destination node.

The destination node determines at least one first switching path from the input wireless message. Preferably, this is the switching path with the lowest costs and, thus, the shortest switching path and switching time. The best switching path is thus, with high likelihood, the shortest communications path via the switching node set with the initialization method.

The wireless message received at the destination node now comprises at least the identification number of the transmitter node and the identification number of the switching node that last transmitted the wireless message before the reception by the destination node. With this information, the path across which the wireless message was transmitted in the wireless network can be traced back to the transmitter node.

With the path information stored during the switching at the individual, participating switching nodes, the path of at least the first switching path is traced back and the switching information is stored at each switching node participating in the first switching path. In addition, in the same way a second or another arbitrary switching path can be traced back and stored at the participating switching nodes. Preferably, for the later operation of stationary transmitter nodes, two switching paths with their path information are stored to have, in addition to the first switching path, at least one redundant switching path predefined and available. For a use of mobile transmitter nodes in the wireless network, preferably as many switching paths are stored and, in this way the method for how switching nodes are provided in the wireless network is selected. In this way, it is achieved that a wireless message sent from a mobile transmitter node moving in the wireless network can be transmitted to the destination node by means of each switching node in the wireless network.

The path information here describes the routes or the tracks of the message via which switching nodes this message is transmitted through the network. Costs are assigned to each set of path information. These costs describe the effort of communications via the associated path. That is, an analysis of the transmission quality under consideration of the number of nodes for the entire transmission path or at least a part of the transmission path is conducted and stored.

In parallel with the process that was just described, the switching information or the path information is deleted at all switching nodes that are not involved in any of the selected switching paths. Path information associated with mobile transmitter nodes to be operated in the network are not deleted, so as not to limit the mobility of these transmitter nodes to one switching path.

After completion of these two processes, all of the switching nodes are set from the initialization state to an operating state.

The previously described initialization method can be repeated with the existing allocation information, that is, without changing the allocation information, for example, when ambient conditions in the wireless network have changed. As a trigger parameter for the repeated initialization with the same allocation information, a regular or irregular, that is, random, time interval could be preset. The initialization method could also be initiated again by the computer described above or by an action of a user on one of the transmitter nodes, switching nodes, or receiver nodes.

An aspect of the invention is directed to an operating method for a wireless network with transmitter nodes and/or receiver nodes and switching nodes, wherein at least one allocation can be preset between one transmitter node and one receiver node after an initialization method according to the principle described above. In one such wireless network, an allocation to one receiver node or destination node is made known to at least one switching node. In this way, a switching path that exclusively comprises those switching nodes to which the allocation is made known is set from one transmitter node to one receiver node. In this way, the transmission and switching of a wireless message in such a wireless networks, takes place according to the following steps:

transmission of a wireless message at the transmitter node, reception of the wireless message at one or more switching nodes, and
if the switching node is not the receiver node, transmission of the wireless message at the switching node and reception of the message at the preset receiver node.

The switching of the wireless message at the switching node, comprises at least the steps:
reception of the message from the transmitter node, and
transmission of the message from the switching node.

The identification number of the destination node and the identification number of the transmitter node are stored in the destination node and in each switching node involved in a preset switching path.

Advantageously, the receiver or destination node transmits an acknowledge signal for acknowledging the received wireless message, wherein at least one switching node or the receiver node itself has a buffer memory for storing the acknowledge signal, so that, when requested by the transmitter node, the acknowledge signal can be transmitted from the buffer memory to the transmitter node. This has the advantage that the transmitter node requires only a very short time interval in order to request the acknowledge signal. Therefore, time delays for the transmission of the acknowledge signal from the destination node to the transmitter node are irrelevant for the request of the acknowledge signal by the transmitter node. In addition, a transmitter node can operate in a very energy efficient way, which plays an enormous role even in energy self-sufficient transmitter nodes.

The initialization method and operating method described above for the wireless network produce another advantage that is reflected in the energy needed for the transmission. Because the number of switching nodes involved in such a transmission is limited, the energy demand for the transmission of a message is also limited, so that switching nodes can be used that can be operated with very low amounts of energy. This means that a use of switching nodes is possible that are energy self-sufficient and that are operated with primary energy that is present in their surroundings and that can be transformed into electrical energy. For this purpose, switching nodes that are energy self-sufficient comprise energy transformers that transform this ambient energy into electrical energy.

Energy transformers that transform the ambient energy into electrical energy are disclosed, for example, in the publications DE 10125059 B4, EP 01568096 B1, DE 10315765 B4, DE 10315764 B4, and DE 102006024167 A1, the contents of all of which are hereby incorporated by reference.

Furthermore, such switching nodes comprise means for receiving wireless messages and additional means for transmitting these wireless messages. Such switching nodes comprise, for example, a receiver device with an antenna, wherein the antenna provides, on the output side, an electrical quantity modulated in amplitude with information. This electrical quantity corresponds to the transmission signal of the wireless message. A resistive element is connected after the antenna. An evaluation unit is connected after the resistive element, wherein the evaluation unit evaluates at least one physical parameter of the resistive element, the physical parameter varies based on the amplitude modulation of the electrical quantity, and the information signal is provided on the output of the evaluation unit. By means of the resistive element, the receiver device exhibits high sensitivity and can receive and demodulate amplitude-modulated reception levels that are less than the transmission level by multiple orders of magnitude, for example, nine orders of magnitude. Because the resistive component features a linear characteristic curve, the sensitivity of the receiver is constant at least across a very large range of reception levels. The sensitivity is therefore significantly higher than for the use of diodes. Therefore, the reception of very small levels is possible with a very low use of electrical energy, without having to use complicated circuit concepts. Through corresponding dimensioning of the resistive element, it is possible to set changes in the physical parameters in ratio with changes to the amplitude-modulated electrical quantities.

For the initialization method and operating method according to an embodiment of the invention for a wireless network, for example, a receiver device that is energy self-sufficient is used as described in the co-pending application Ser. No. 12/497,519 for "Receiver Device, System, and Method for Low-Energy Reception of Data".

BRIEF DESCRIPTION OF THE DRAWINGS

An embodiment of the invention is shown in the following drawings.

DETAILED DESCRIPTION OF THE DRAWINGS

Figure 1:
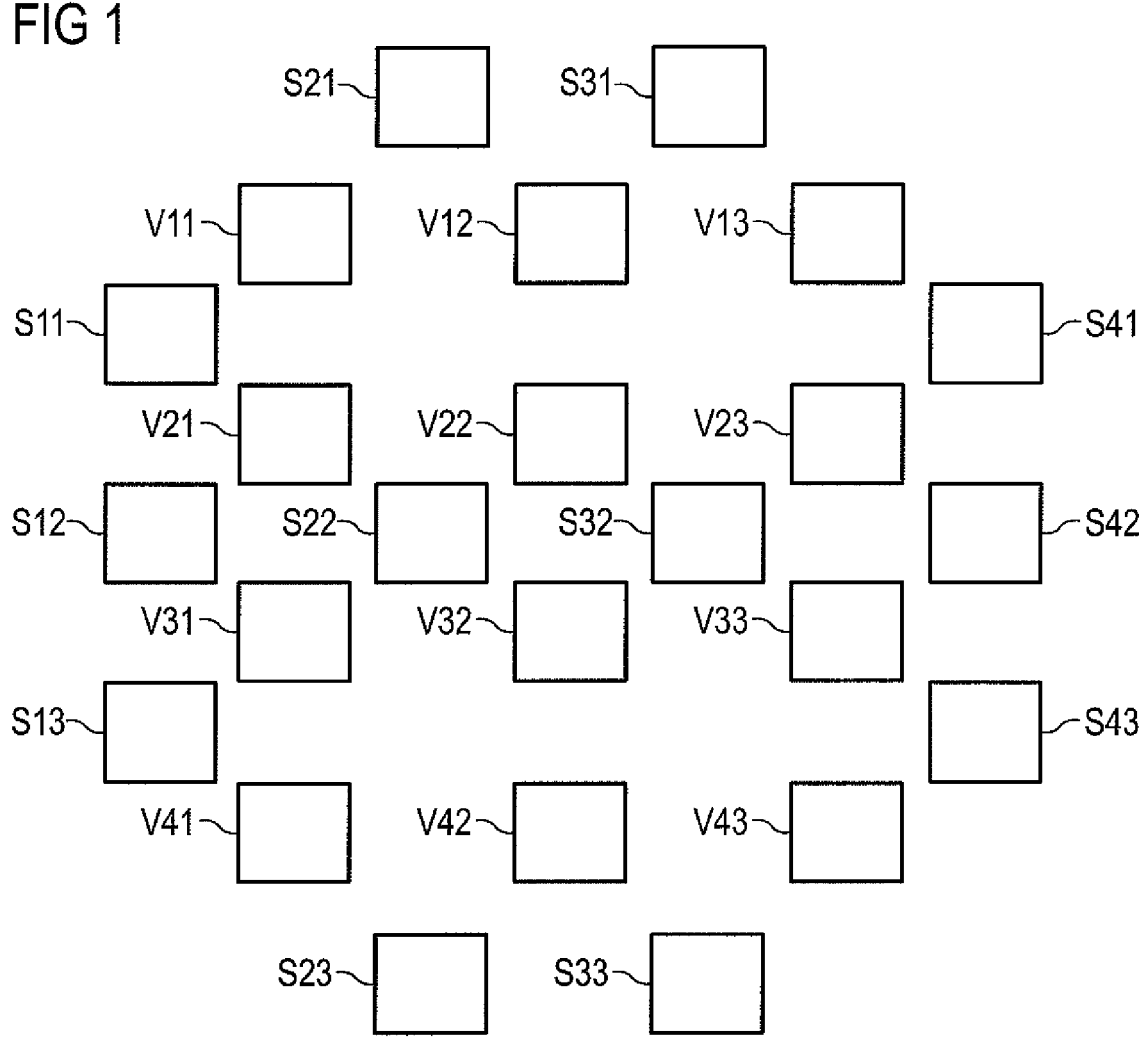
FIG. 1, a schematic arrangement of a wireless network.

FIG. 1 shows a schematic diagram of an example wireless network with a plurality of transmitter nodes S11 to S43 and a plurality of switching nodes V11 to V43. Each switching node V11 to V43 of the embodiment is constructed to receive and transmit wireless messages and can be coupled with an additional device. In this way, any switching node could also be used as a receiver node. This advantageous property is shown in the embodiment of the wireless network described and shown below. Each individual transmitter node S11 to S43 of the wireless network is constructed to transmit messages; message reception at a transmitter node S11 to S43 in this embodiment is not provided.

Each individual transmitter node S11 to S43 is consequently constructed for unidirectional wireless communications. Each individual switching node V11 to V43 is constructed for bidirectional wireless communications and simultaneously forms a receiver node.

The diagram, in particular, the labeling or the numbering of the individual network components, is laid out column by column for improving clarity. The first column, at the left in the diagram, comprises the transmitter nodes S11, S12, and S13. The second column of the diagram comprises four switching nodes V11, V21, V31, and V41. The third column of the diagram comprises three transmitter nodes S21, S22, and S23. The fourth column of the diagram comprises four switching nodes V12, V22, V32, and V42. The fifth column of the diagram comprises three transmitter nodes S31, S32, and S33. The sixth column of the diagram comprises four switching nodes V13, V23, V33, and V43. The seventh column completes the diagram and comprises three transmitter nodes, namely, the transmitter nodes S41, S42, and S43.

Figure 2:
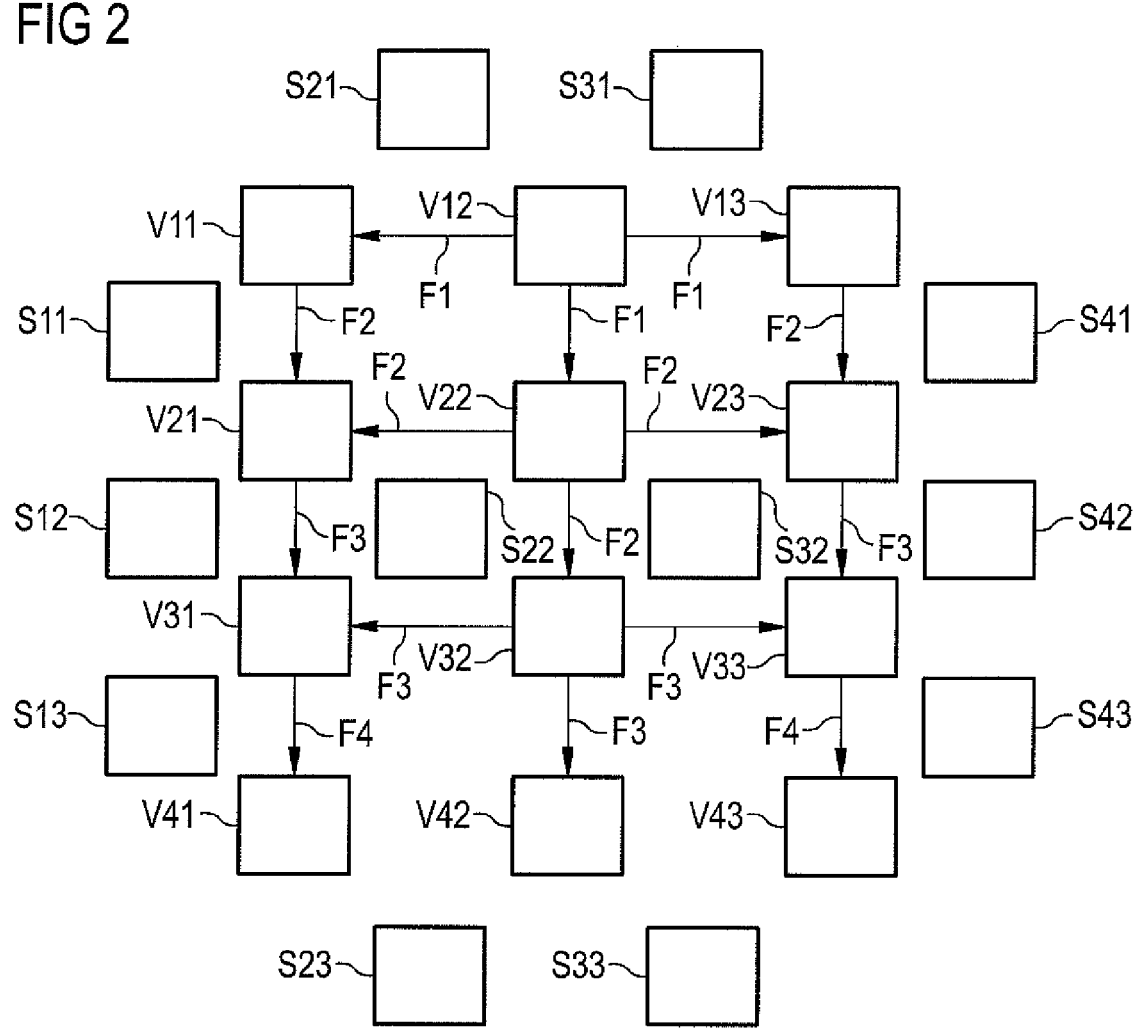
FIG. 2, the wireless network with diagram of switching steps.

Using the example of the wireless network shown schematically in FIG. 1, FIG. 2 shows the propagation of a wireless message according to a tree structure starting from a receiver or switching node through the entire wireless network. The propagation begins with a first switching step F1 at the switching node V12. The switching node V12 consequently forms the root of the tree structure. The switching nodes V11, V13, and V22 adjacent to the switching node V12 are located within the transmission range of the switching node V12 and thus receive a wireless message transmitted by the switching node V12. Each of the switching nodes V11, V22, and V13 similarly transmits the wireless message after its reception. In this way, the wireless message is transmitted in a second switching step F2 to additional switching nodes V21, V32, and V23. The process just described repeats with a third switching step and finally with a fourth switching step until all of the switching nodes of the wireless network have received the wireless message at least once.

Figure 3:
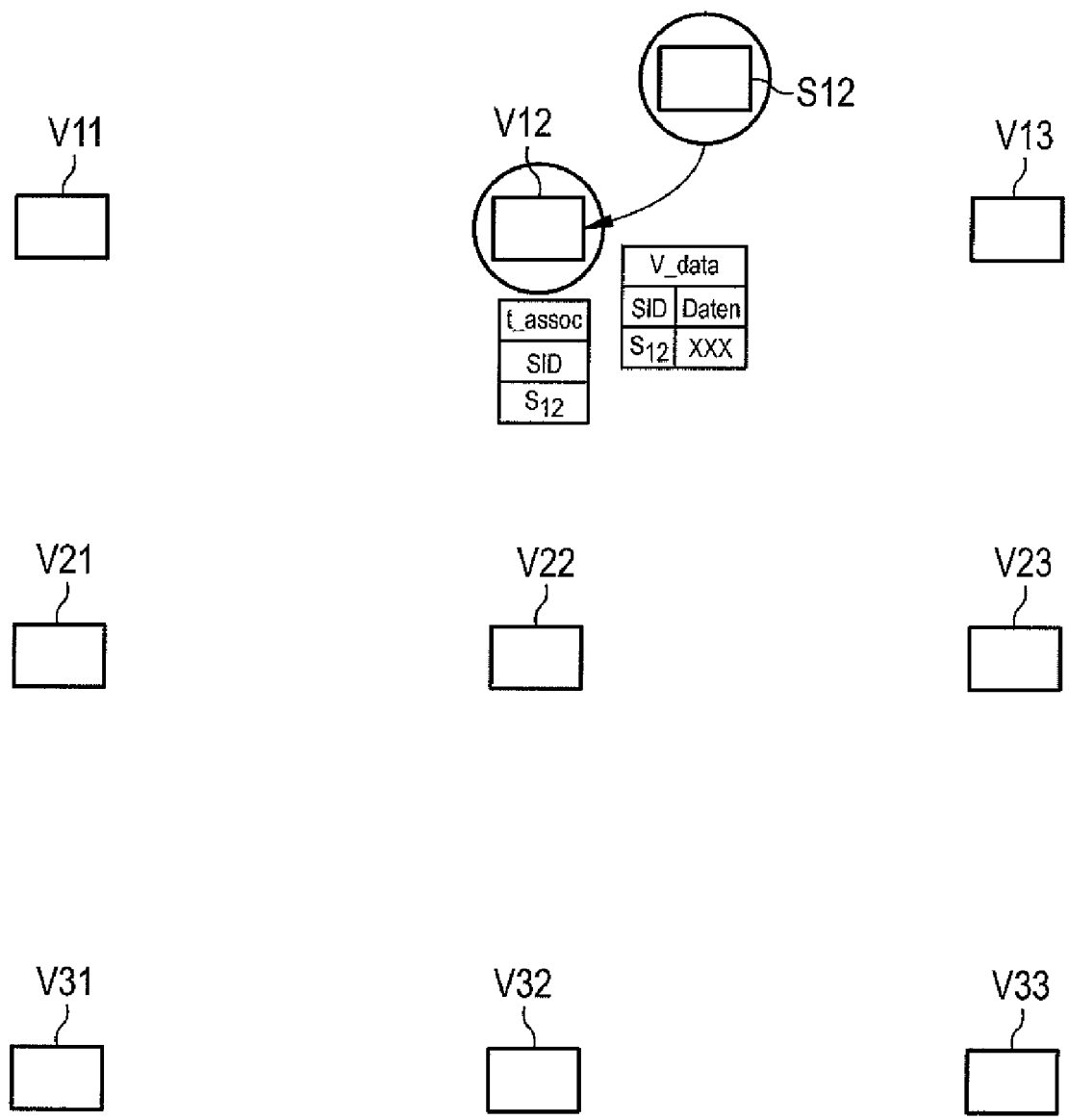
FIG. 3, registration method of a transmitter node on the destination node.

The initialization method of the wireless network begins with a first step shown in FIG. 3. In this first step, the transmitter node S12 is arranged in the immediate vicinity of a destination node, in the shown embodiment, the destination node is formed by the switching node V12. At the destination node V12, an initialization state is initiated. At the transmitter node S12, a wireless message is transmitted. The wireless message is transmitted in the embodiment after an activation of a push button that is provided for this purpose and that is not shown in the figure. The wireless message is received by the switching node V12 and transmitted further in the wireless network according to the tree structure described above.

In practice, the wireless range of each individual switching node is limited. In the schematic diagram of FIG. 4, the range of the destination node V12 reaches up to its immediately adjacent switching nodes V11, V22, and V13. Thus, the wireless message originating from the destination node V12 reaches the switching nodes V11, V22, and V13.

Figure 5:
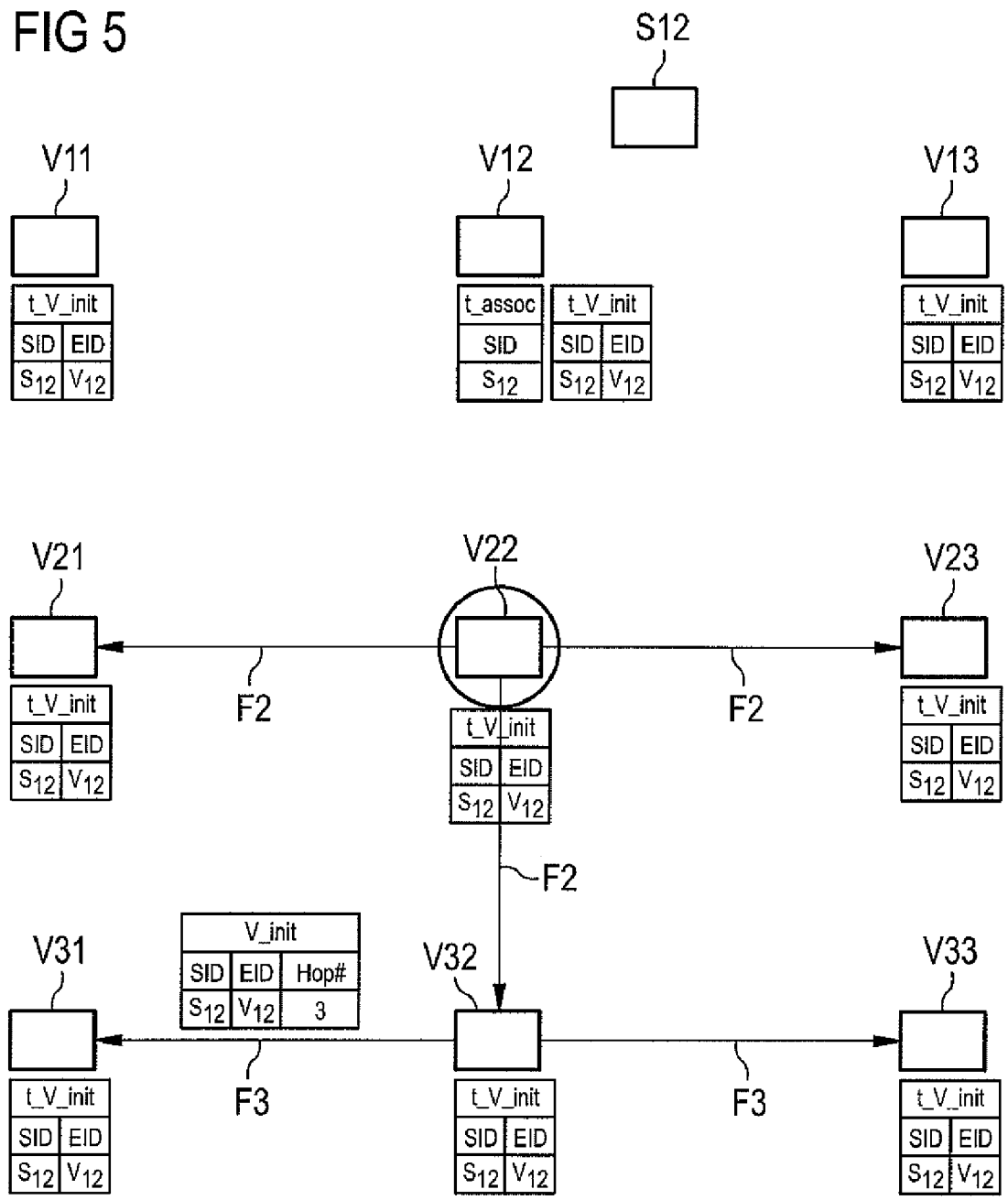
FIG. 5, transmission of the registration information via a switching node.

These switching nodes also provide a limited range and forward the received wireless message, in turn, to the switching nodes adjacent to them. This is shown in FIG. 5 using the example of the switching node V22. The range of the switching node V22 is sufficient to transmit the wireless message to the switching nodes V21, V32, and V23.

Figure 4:
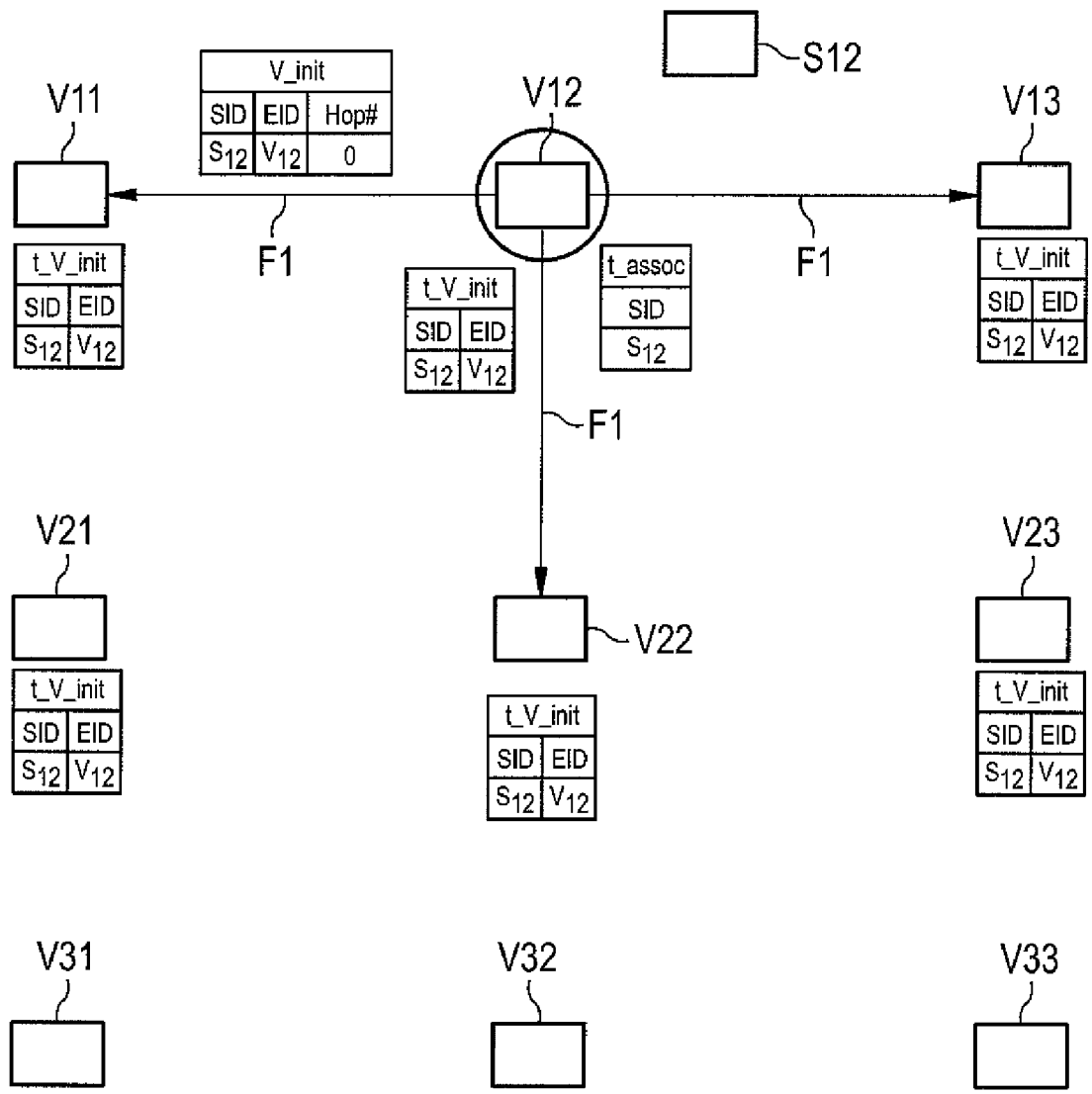
FIG. 4, propagation of the registration information at the switching node.

In this way, in a first switching step F1, shown in FIG. 4, the switching nodes V11, V22, V13 can be reached and with a second switching step F2, shown in FIG. 5, the switching nodes V21, V32, and V23 can already be reached. With a third switching step F3, the switching nodes V31, V33, and V42 can also be reached, shown in FIG. 5 with FIG. 2. With a fourth switching step F4, the switching nodes V41 and V43 can also be reached, shown in FIG. 2. In this way, in the shown wireless network, after four switching steps F1, F2, F3, and F4, the registration information is distributed in a tree-like way to all switching nodes.

FIG. 3 shows a section of the wireless network shown schematically in FIGS. 1 and 2. The transmission node S12 for transmitting the registration information is arranged in the immediate vicinity of the switching node V12. The transmission of the registration information to the switching node V12 starting from the transmitter node S12 is performed at a reduced transmission power, so that the range of the transmitted wireless message is limited such that only the switching nodes that are located in the immediate vicinity of the transmitter node S12 can receive this message.

For triggering the transmission of the registration information, on the transmitter node S12, there is a trigger device, for example, a contact switch, and after it is activated, the registration information is transmitted by the transmitter node S12. The registration information includes at least transmitter identification SID of the transmitter node S12. This information is received and stored at the switching node V12. With this process, the registration information is transmitted to the switching nodes. The switching node V12 is, thus, allocated to the transmitter node S12 and is, thus, the destination node for wireless messages of the transmitter node S12. Furthermore, with the reception of the registration information, the initialization method of the wireless network is initiated.

FIG. 4 shows details of the registration information and allocation information formed in interaction with the transmitting node V12. The allocation information includes the transmitter identification number SID and receiver identification number EID. The corresponding identification numbers SID or EID are set equal to the reference symbols used for the transmitter nodes or switching nodes in the shown embodiment for the sake of clarity. Each individual switching node V11, V12, and V22 that receives this information stores the information in a memory.

FIG. 5 shows, using the example of the switching node V22, how the wireless message is forwarded, in turn, to additional switching nodes. The additional switching nodes just mentioned are those that could not be reached by the first switching step F1 due to their distance from the destination node V12. In this way, the switching node V22 forwards the allocation information to the switching nodes V21, V32, and V23, wherein, however, the preceding switching node V12 also receives this wireless message. At the switching node V12, the wireless message is compared with stored information, and if it matches the previously transmitted message, the wireless message just received is either discarded or used according to a reception confirmation and then discarded.

Figure 6:
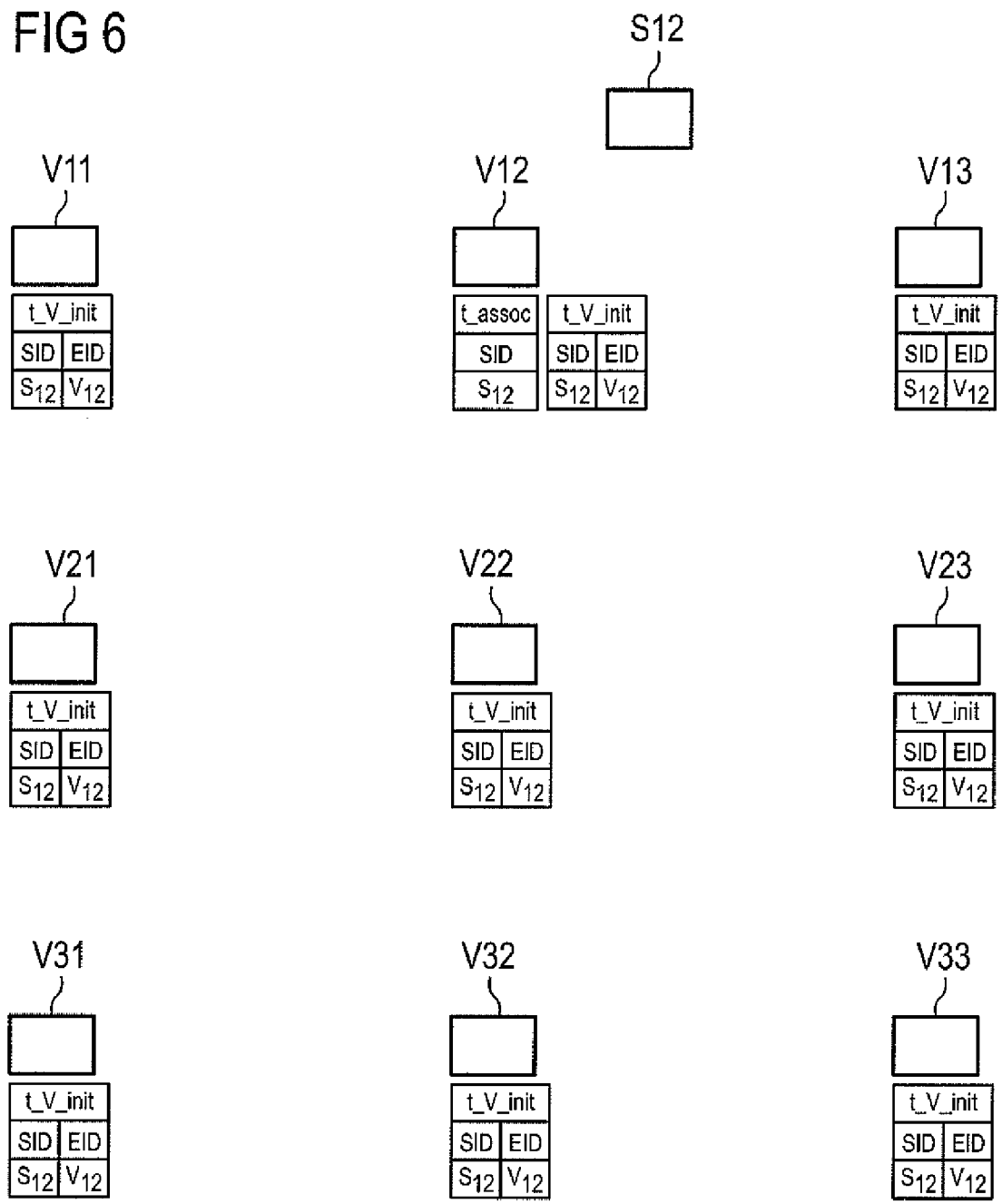
FIG. 6, state of the switching node after transmitting the registration information, FIG. 7, transmission of a wireless message at the transmitter node, FIG. 8, switching the wireless message in the wireless network, FIG. 9, switching the wireless message in the wireless network, FIG. 10, switching the wireless message in the wireless network, FIG. 11, state of the wireless network at the end of the switching of the registration information in the wireless network, FIG. 12, tracing the switching path back to the participating switching nodes, FIG. 13, storing the path information of the switching path, FIG. 14, storing the path information of the switching path, FIG. 15, state of the wireless network after completing the storage of the path information of the switching path, FIG. 16, completion of the initialization at all switching nodes, FIG. 17, state of the network after completion of the initialization, FIG. 18, transmission of a wireless message, FIG. 19, forwarding of the wireless message, FIG. 20, forwarding of the wireless message, FIG. 21, forwarding of the wireless message, FIG. 22, registration process of a mobile transmitter node, FIG. 23, registration process of a mobile transmitter node, FIG. 24, propagation of the registration information of the mobile transmitter node to the switching node, FIG. 25, propagation of the registration information of the mobile transmitter node to the switching node, FIG. 26, state after distribution of the registration information of the mobile transmitter node, FIG. 27, transmission of a wireless message by means of the mobile transmitter.

FIG. 6 shows the state in the wireless network after the second wireless step. Each of the switching nodes V11 to V33 involved up to this point has now stored the allocation information of the transmitter node S12 to the switching node V12 and, thus, to the receiver node V12. The allocation information is stored by means of storing the transmitter identification SID and the receiver identification EID in a memory.

Figure 7:
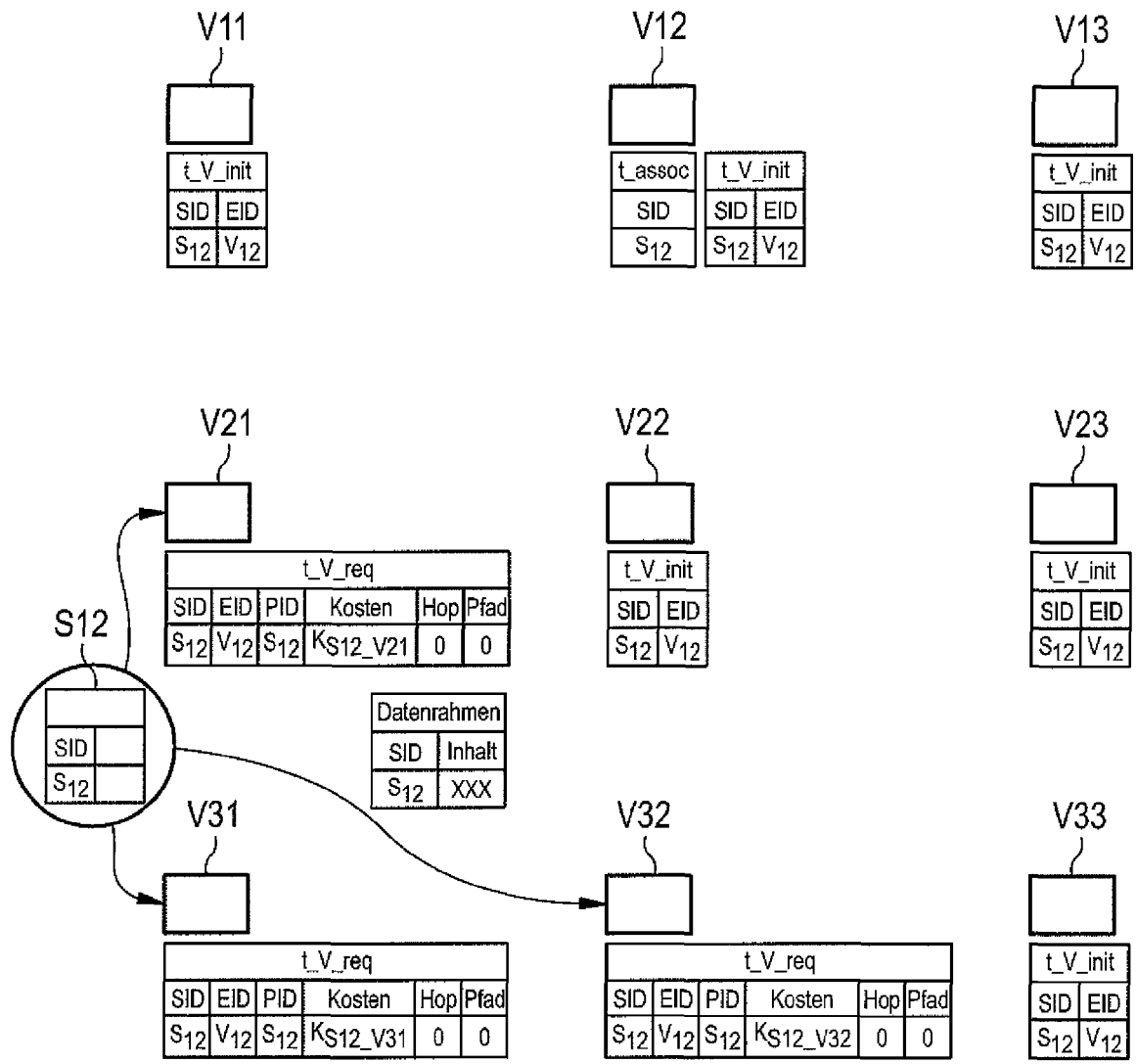

FIG. 7 shows another step of the initialization method of the wireless network in which the transmitter node S12 is now brought to its defined location. At the defined location, a wireless message that includes at least the transmitter identification SID of the transmitter S12 is transmitted. This wireless message is received by the immediately adjacent switching nodes V21, V31, and V32.

Figure 8:
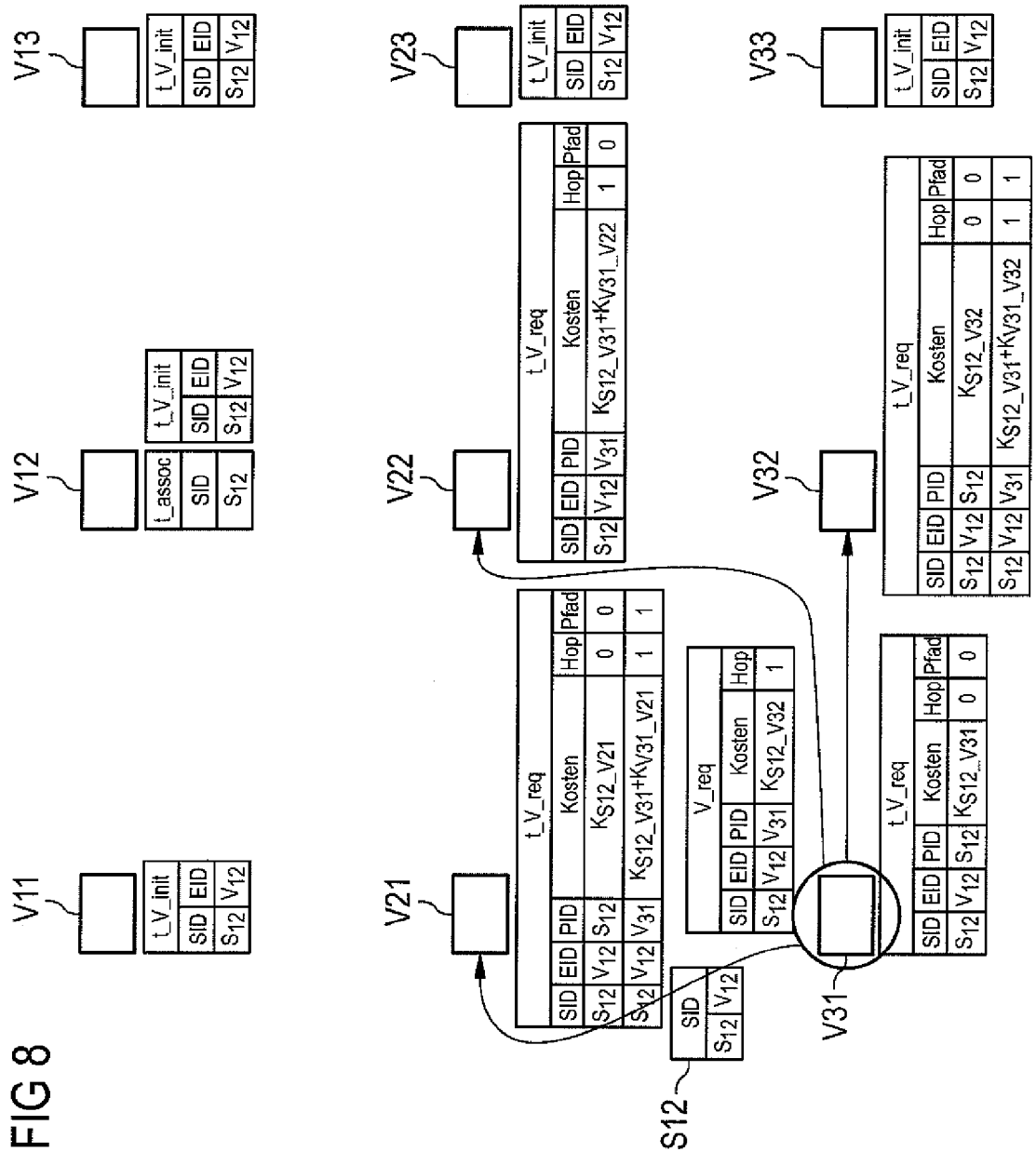

At each of the switching nodes V21, V31, and V32 that receives this wireless message, it is tested whether a receiver identification EID is allocated to the received transmitter identification SID. If there is such an allocation, then this allocation is detected at the corresponding switching nodes V21, V31, or V32, and the wireless message is expanded with the appropriate switching node identification and transmitted. This is shown in FIG. 8 using the example of the switching node V31. The switching node V31 forwards the information and allocation to the receiver node V12 received from the transmitter node S12 to the switching nodes V21, V22, and V23 adjacent to it. The switching nodes V21 and V32 receive the wireless message transmitted by the transmitter node S12 a second time. This event is also stored, as shown in FIG. 8, in the corresponding memories of the switching nodes V21 and V32. In addition, the switching node identification PID of the previous switching node is also stored. This is shown in the tabular diagram allocated to the switching nodes V21 and V32. There, first, the allocation information of the first reception directly from the transmitter node S12 is recorded in the table and, second, the same allocation information that reaches the switching node V21 or V32 via the switching node V31.

Figure 9:
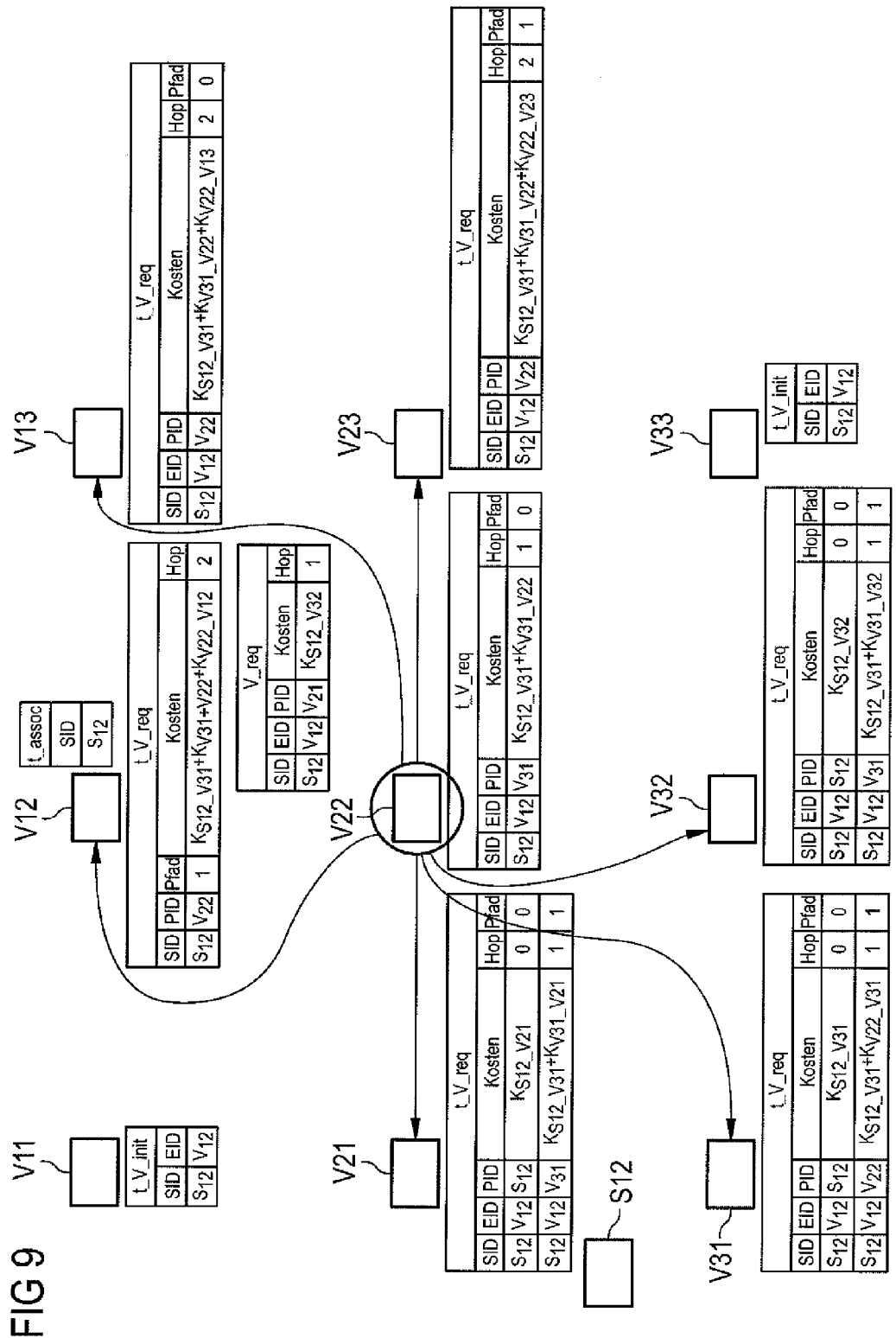
Figure 10:
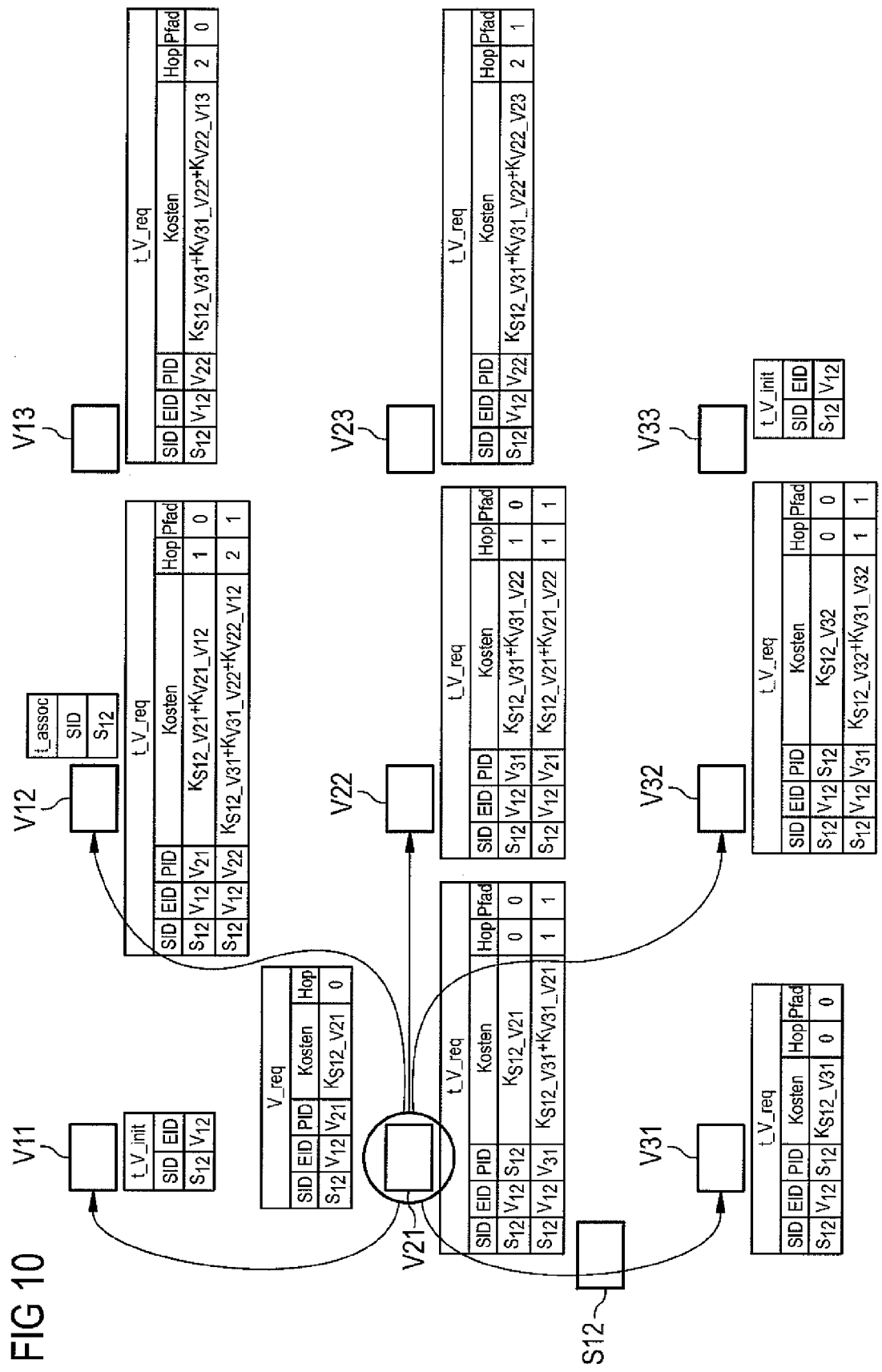

FIG. 9 shows the additional switching process starting from the switching node V22. Here, the wireless message is now switched to the switching nodes V12, V13, V21, V23, V32, and V31. In the corresponding switching nodes, both the information with respect to the allocation of the transmitter node and the receiver node and also the path via which switching nodes the message was transmitted will be stored. In this way, in each node, the allocation of the transmitter identification to the receiver identification is stored with the corresponding transmission paths that the allocation information has traversed. If the allocation information reaches, as shown in FIG. 9, the switching node V12 that is allocated as the receiver node or destination node to the transmitter node S12, then the corresponding switching data is also stored here.

Figure 11:
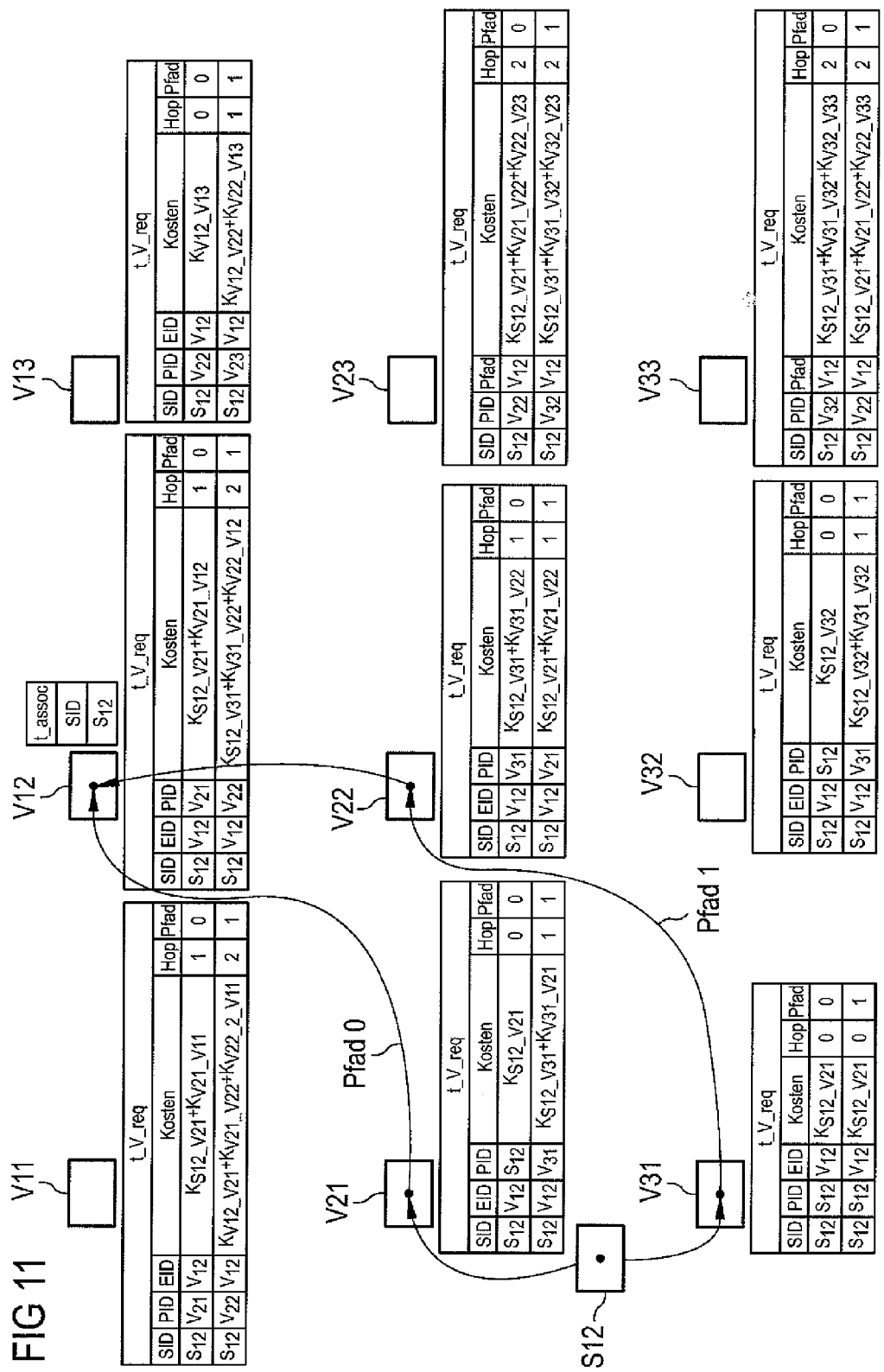

FIG. 11 shows a state in which the wireless network is located when the wireless message is transmitted across the entire wireless network and the involved switching nodes V11 to V33. Each of the involved switching nodes V11 to V33 and, thus, also the destination node V12 provides switching data that comprises information on which path the allocation information has traversed up to its reception by the relevant switching node. The table allocated to the switching node V12 in the diagram shows, in the diagram, the essential memory contents of the memory at the destination node V12. Consequently, the wireless message is led via path 0 and path 1 to the switching node V12. Path 0 is described starting from the transmitter node S12 via the switching node V21 to the switching node V12, wherein path 0 comprises a switching node between the destination node and transmitter node. Path 1 is formed from the transmitter node S12 and the switching nodes V31, V22, and V12, wherein this path is formed via two switching nodes V31 and V22 between the transmitter node S12 and destination node V12. The first wireless messages arrive at the destination node via the switching paths Path 0 and Path 1. These are now defined as preferred switching paths.

Figure 12:
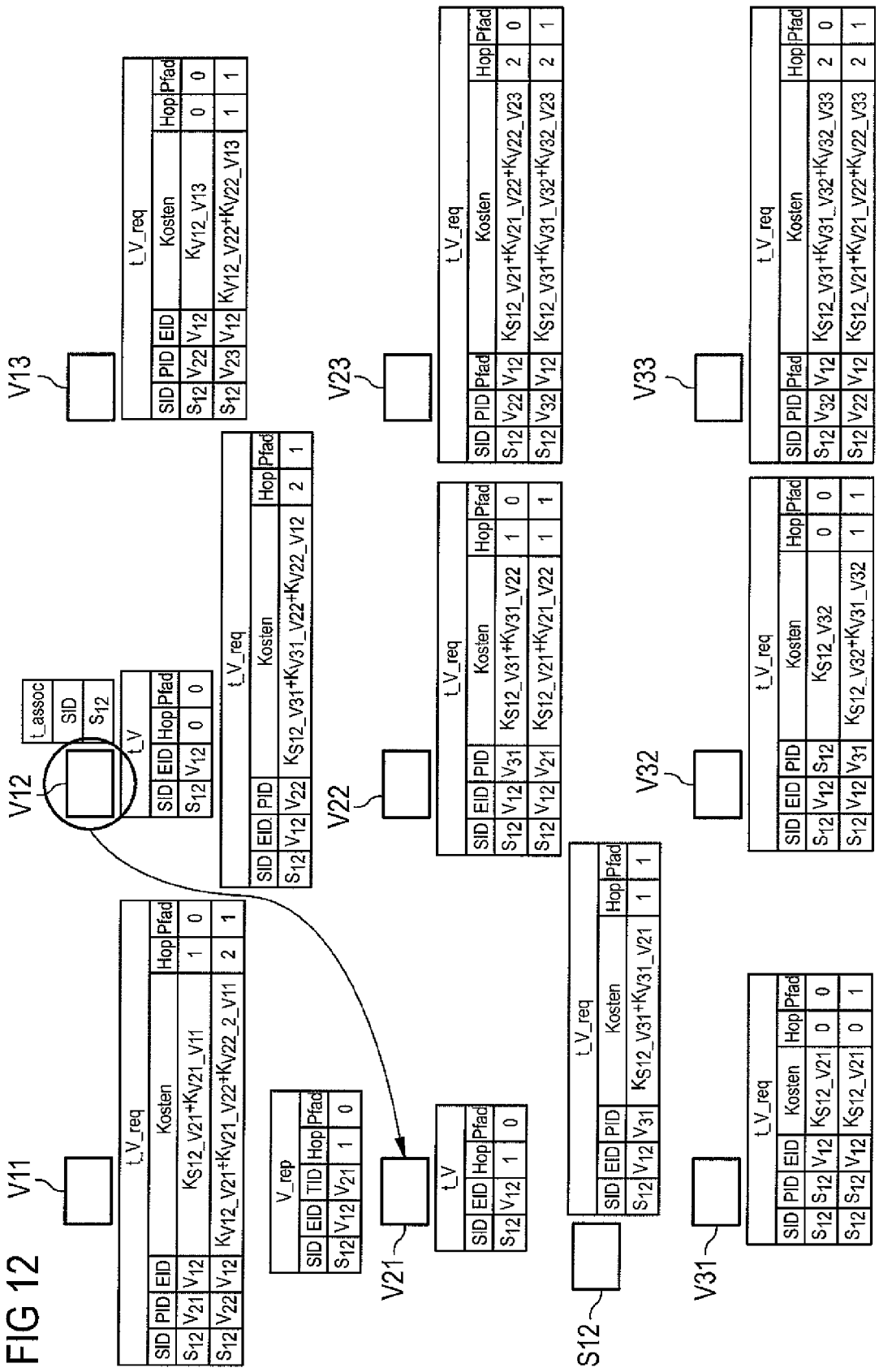
Figure 13:
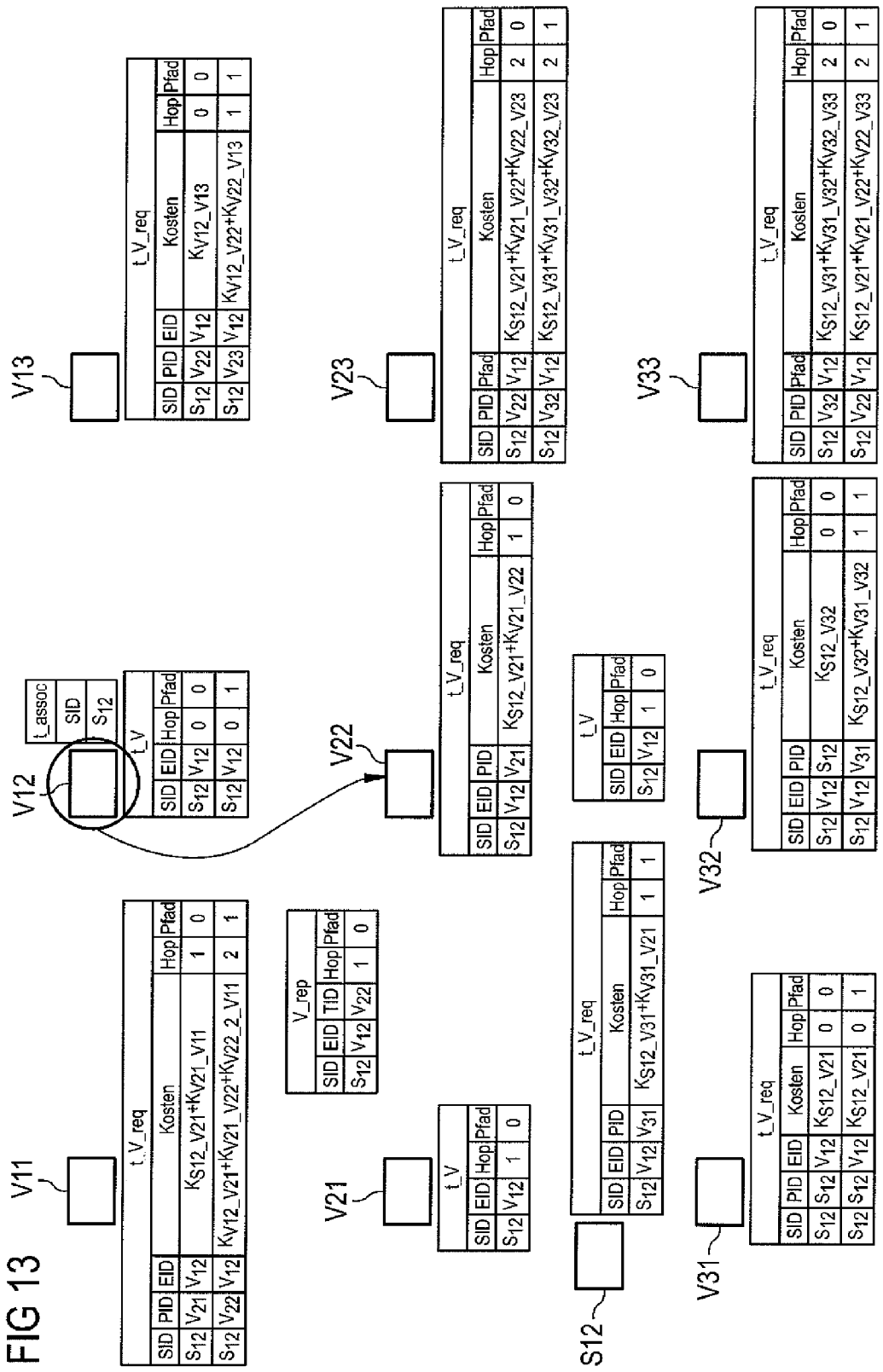
Figure 14:
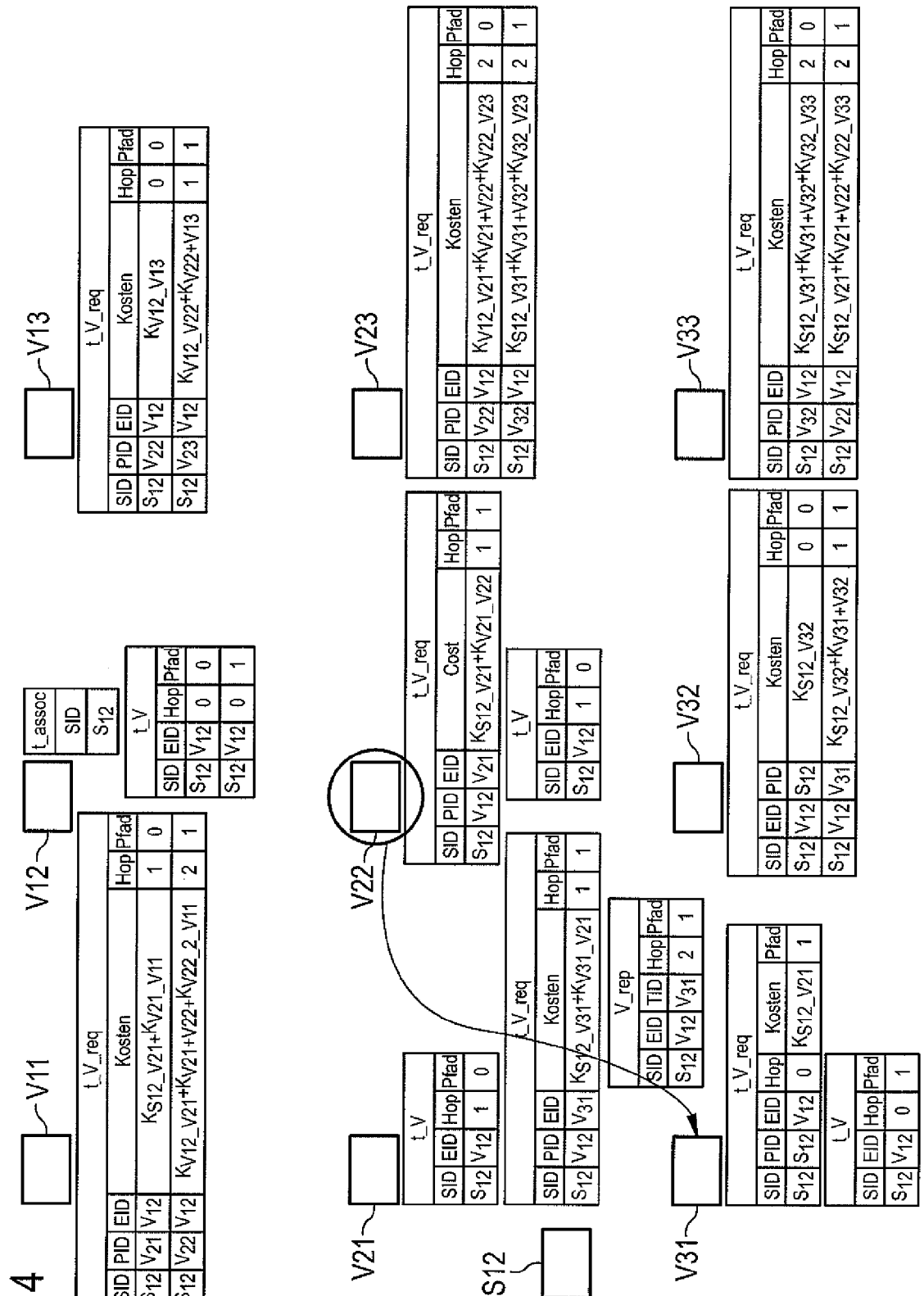

FIG. 12 now shows the switching reply on the part of the destination node V12. By means of this reply, a final step of the initialization method is initiated. In this way, a signal that signals the end of the initialization method is transmitted to each involved switching node V21 and V22 tracing the preferred switching paths, wherein the switching nodes V21 and V22 involved in the preferred switching paths change from the initialization state to an operating state. FIGS. 13 and 14 show this process. FIG. 14 shows the forwarding of this signal from the switching node V22 to the switching node V31. After successful transmission, all of the switching nodes V21, V22, and V31 involved in the two transmission paths are changed to the operating state.

Figure 15:
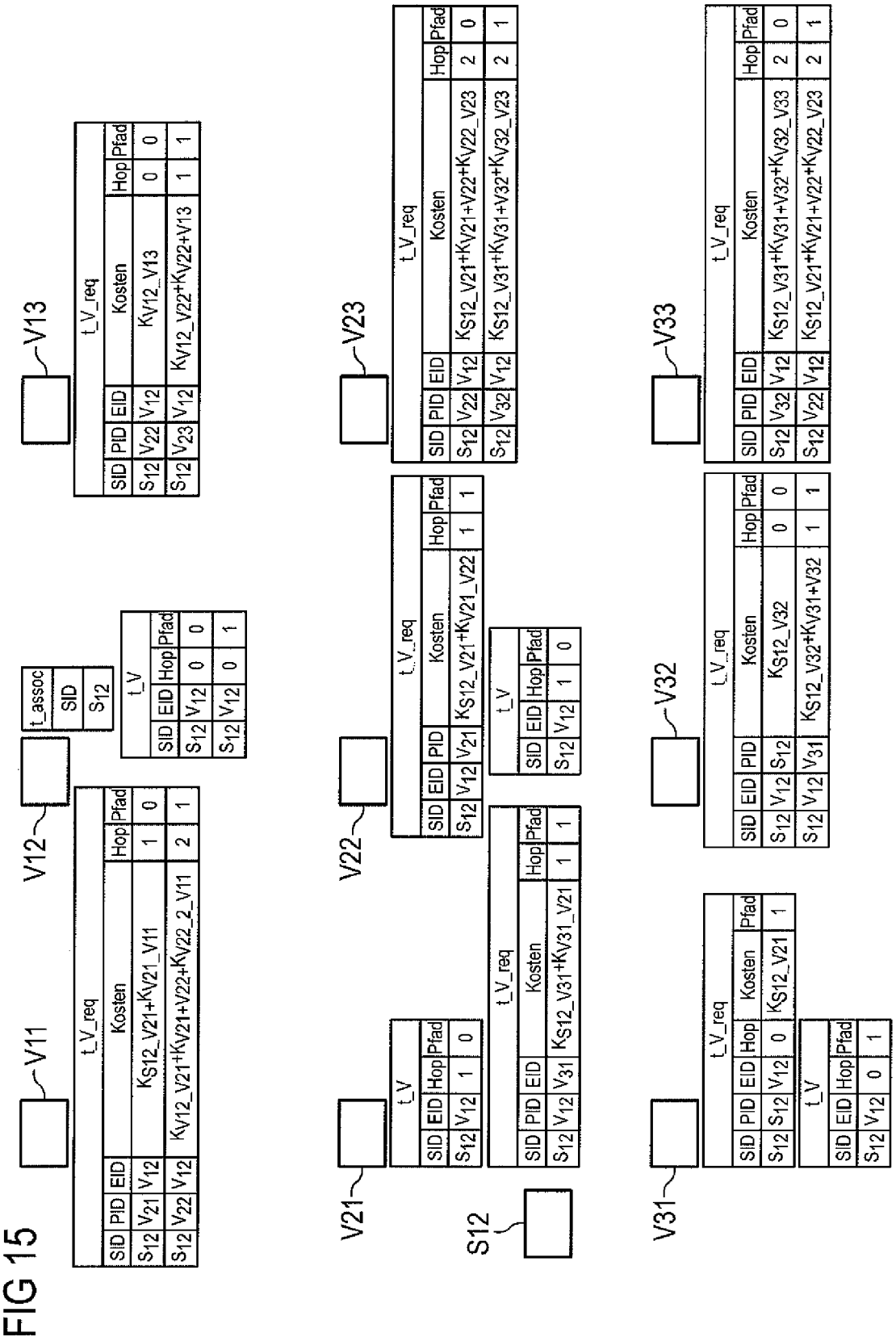

FIG. 15 shows the state of the wireless network at the end of this signal. Each individual switching node V21, V22, V31 involved in the transmission path stores the information on the transmission path.

Figure 16:
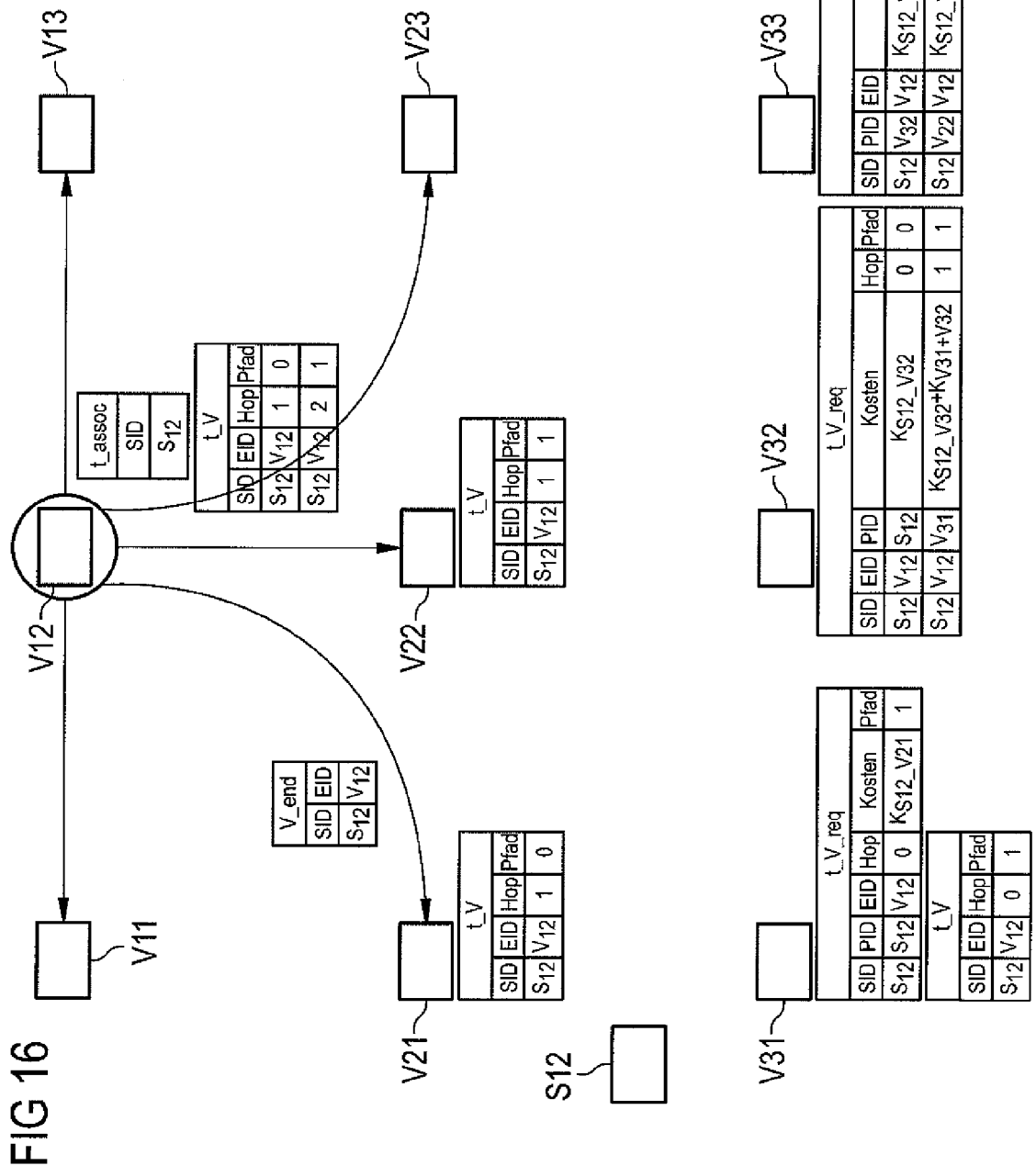

Finally, the last step of the initialization method in the embodiment shown in FIG. 16 takes place in which the end of the initialization method has been transmitted to all of the switching nodes of the wireless network starting from the switching node V12 to the destination node. This causes the individual nodes that are not involved in the switching path Path 0 or Path 1 to delete all of the initialization and allocation information these nodes had stored since the beginning of the initialization method. Only the switching nodes V12, V22, and V31 involved in the switching path permanently keep the information of the switching path at the end of the initialization method.

Figure 17:
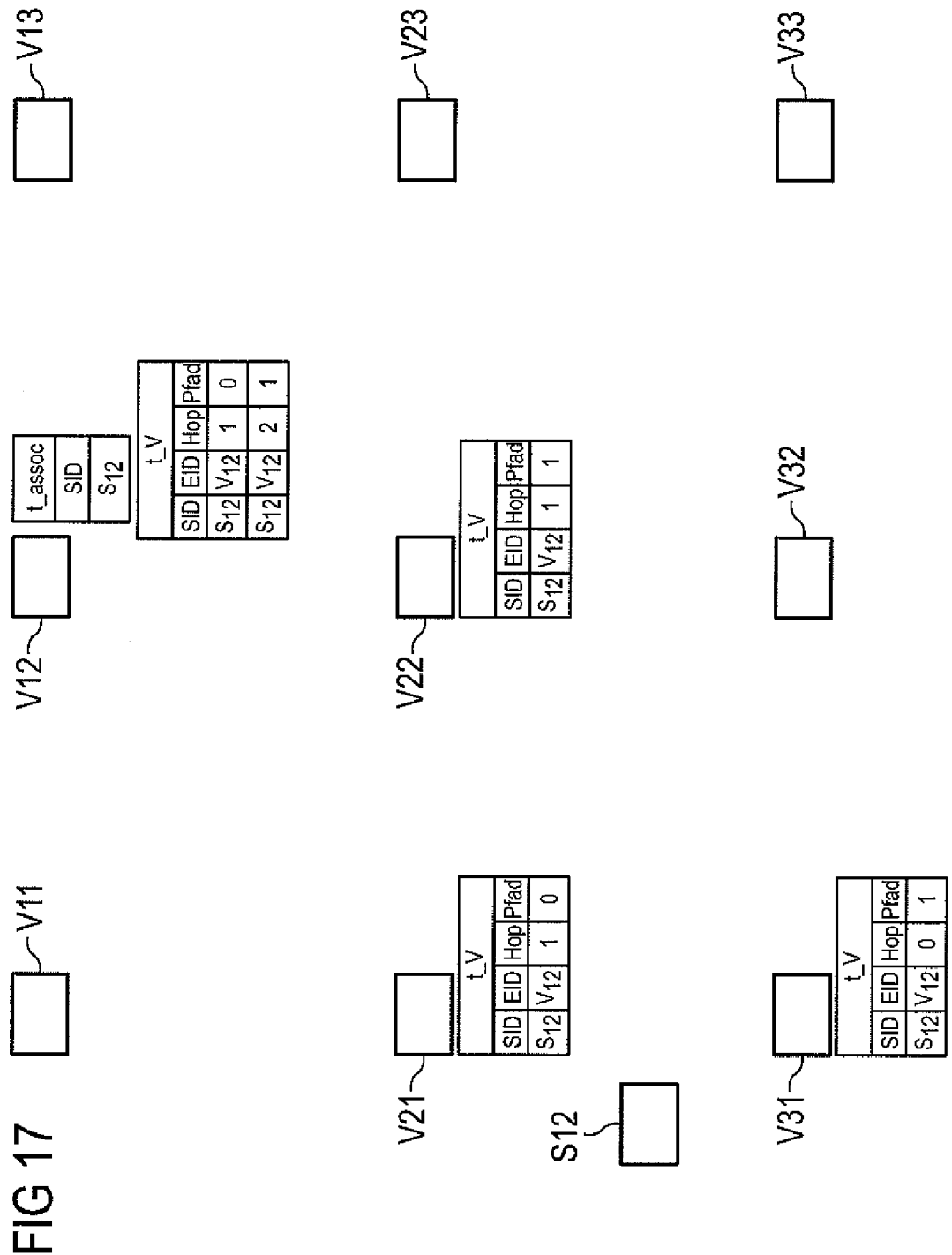

At the end of the initialization method, the state shown in FIG. 17 is reached in which all of the switching nodes involved in the switching path Path 0 or switching path Path 1 have and have stored the allocation information of the transmitter ID to receiver ID and have also stored the path information of the transmission paths. All of the other switching nodes of the wireless network have deleted this information.

Figure 18:
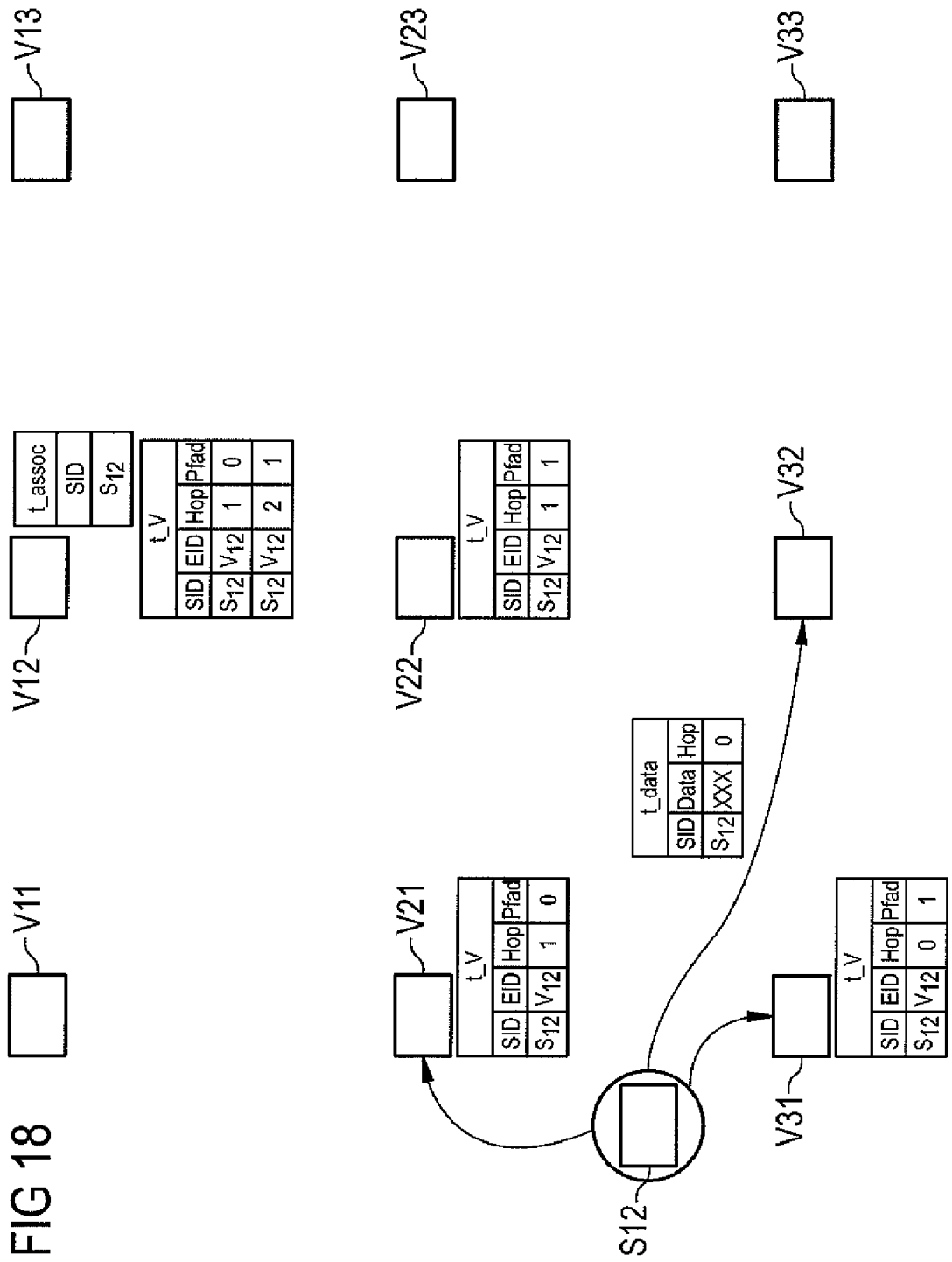

FIG. 18 shows the transmission of a wireless message from the transmitter node S12 after the initialization method of the wireless network, wherein the switching nodes V21, V31, and V32 receive the wireless message in turn. Due to the previously described initialization method, an allocation of the transmitter node S12 to the switching node and destination node V12 is stored only in the switching nodes V21 and V31. This allocation is not stored at the switching node V32, so that the switching node V32 is not triggered to forward the message. The message is forwarded via the Path 0 or Path 1 fixed in the initialization method. All of the switching nodes arranged in the wireless network are located in a rest state with very low energy consumption, these nodes are set to an operating mode by means of the reception of a wake-up signal or the transmitter identification SID of the allocated transmitter node S12, and the message is forwarded by transmission.

Figure 19:
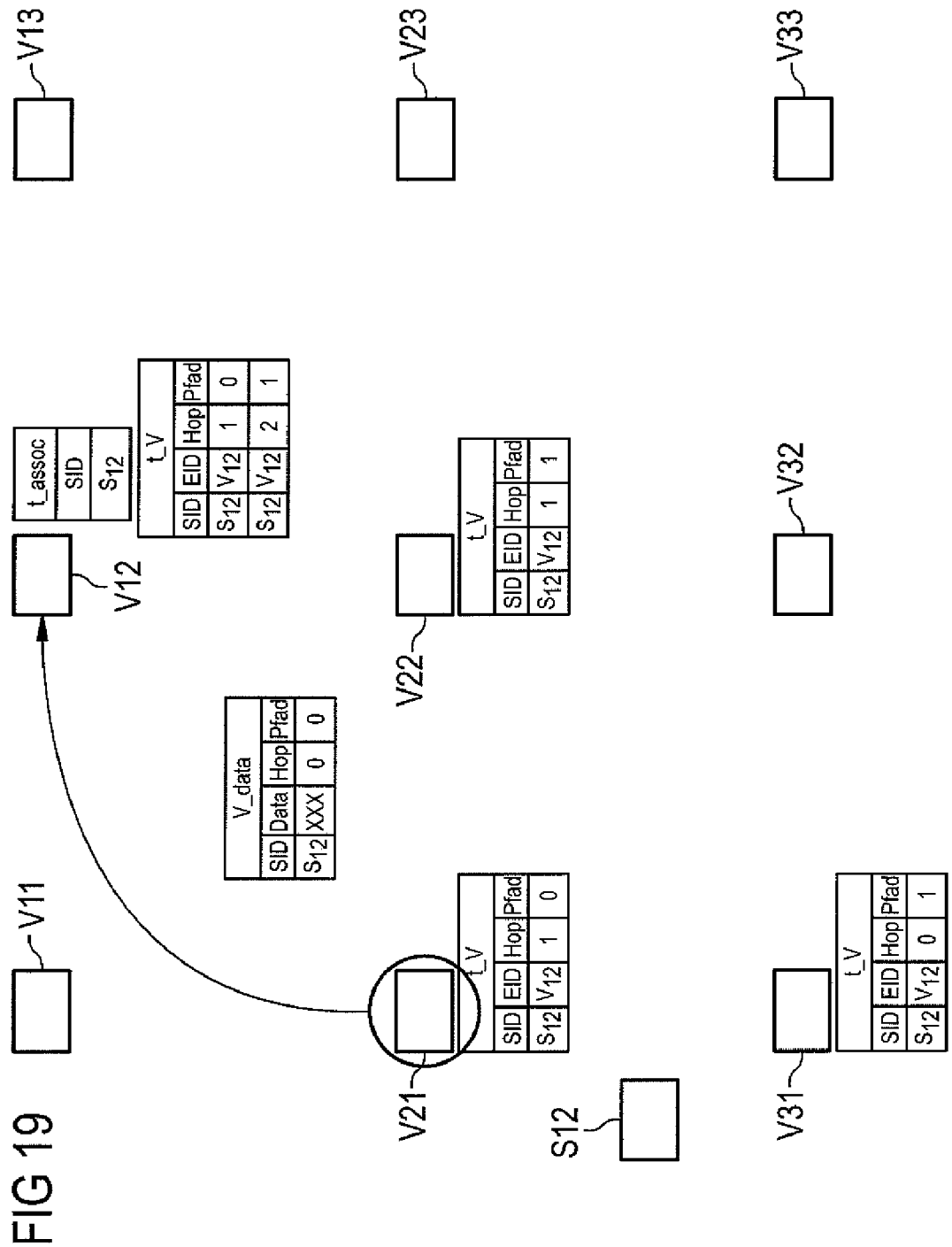
Figure 20:
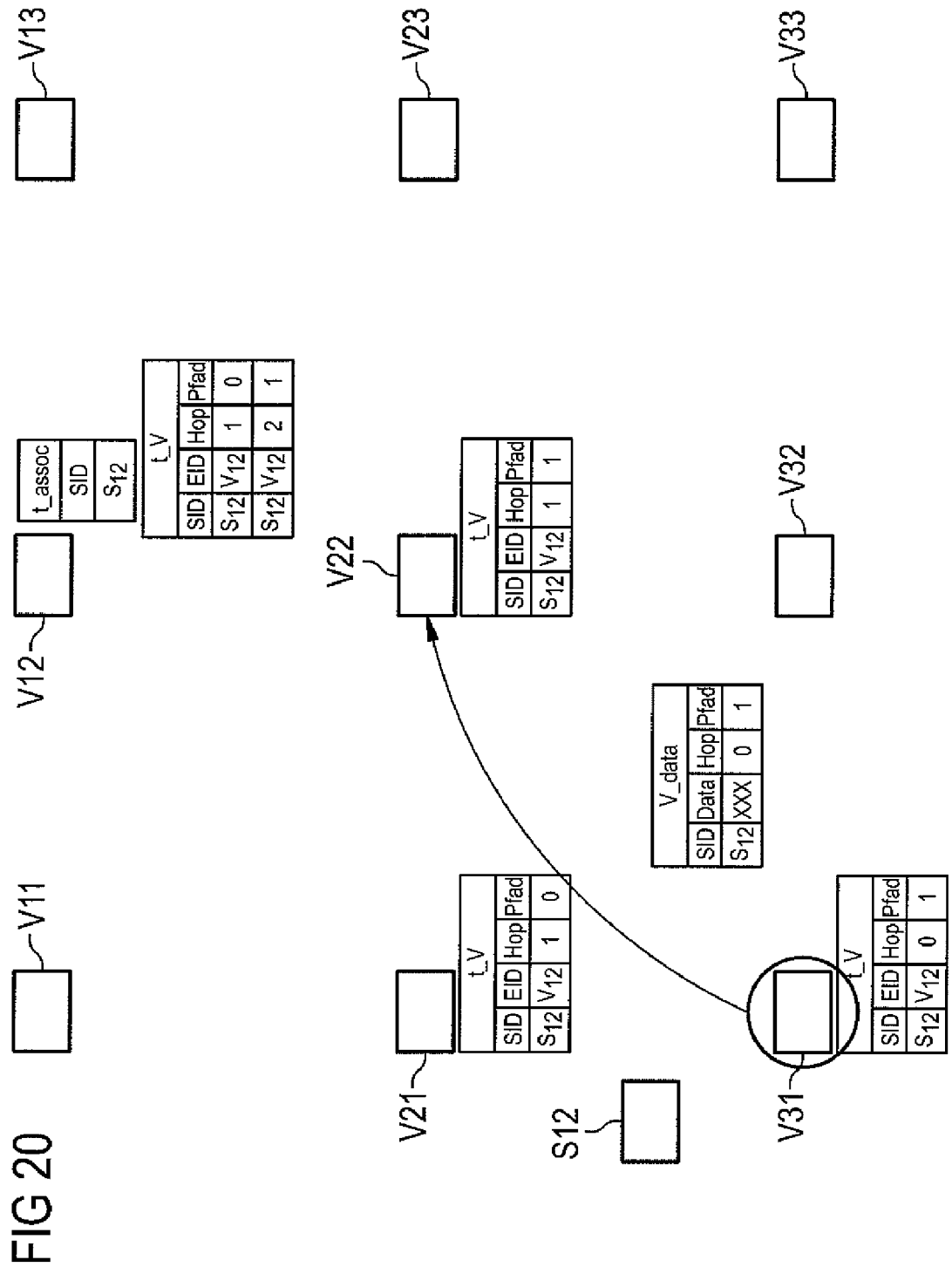
Figure 21:
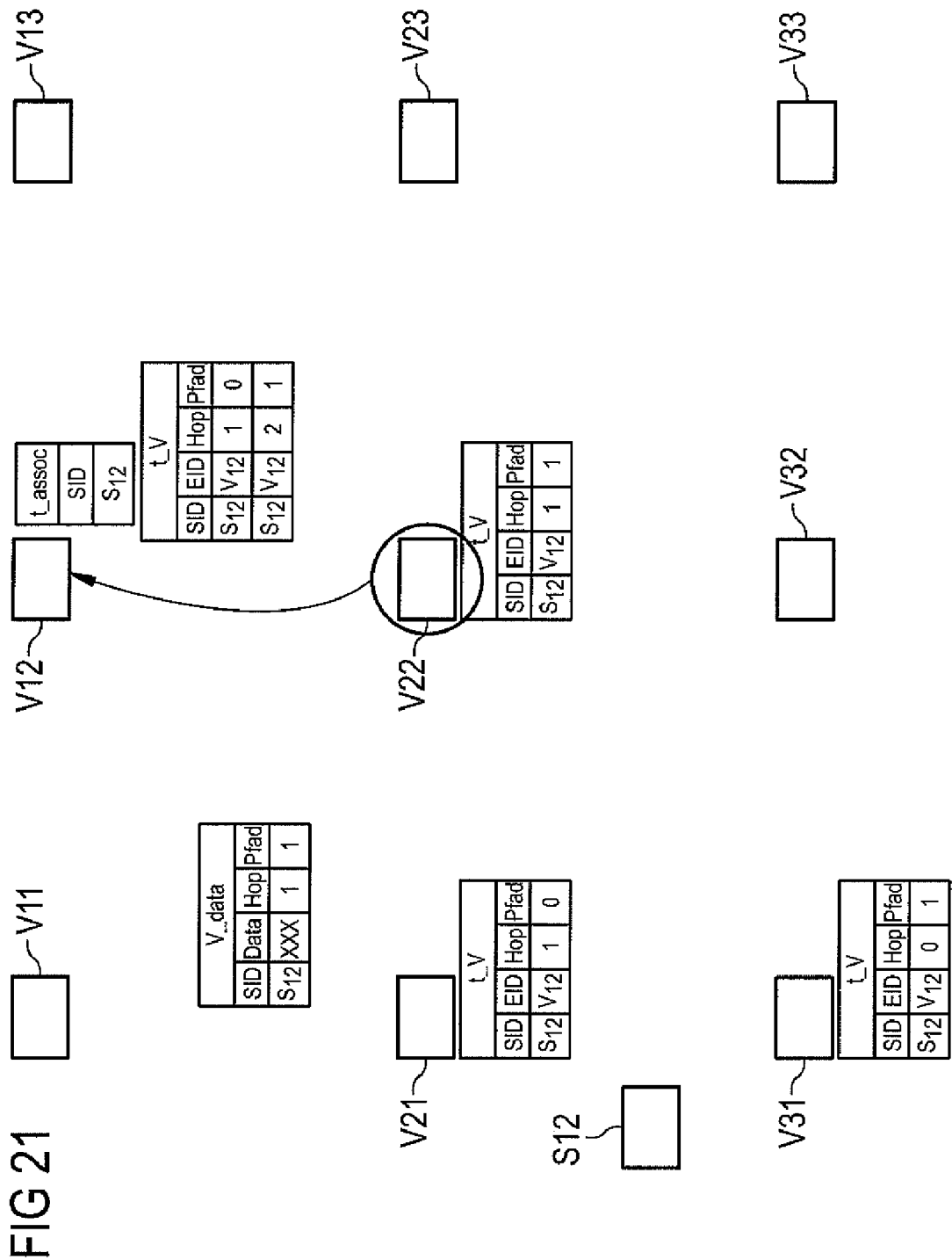

That is, as shown in FIG. 19, the message is forwarded from the switching node V21 to the switching node and destination node V12 according to the switching information and allocation information stored in its memory. The same happens, as shown in FIG. 20, at the switching node V31 that forwards this information to the switching node V22. Shown in FIG. 21, the switching node V22 forwards the information to the switching node V12 and, thus, to the destination node.

In this way, the information reaches the destination node V12 starting from the transmitter node S12 via a fixed Path 0 and Path 1. By means of the transmission paths preset in the initialization method, confirmations of the transmission back to the transmitter of the signal or to a previous switching node are not absolutely necessary, so that a large amount of transmission energy could be saved in this way. The transmission and forwarding of any information from a first switching node to another switching node and then, in turn, the forwarding to the additional switching node can be evaluated according to a preferred embodiment of the method from the previous switching node as a transmission confirmation and reception confirmation of the wireless message previously transmitted by it. Thus, an additional transmission of a reception confirmation could be eliminated.

Figure 22:
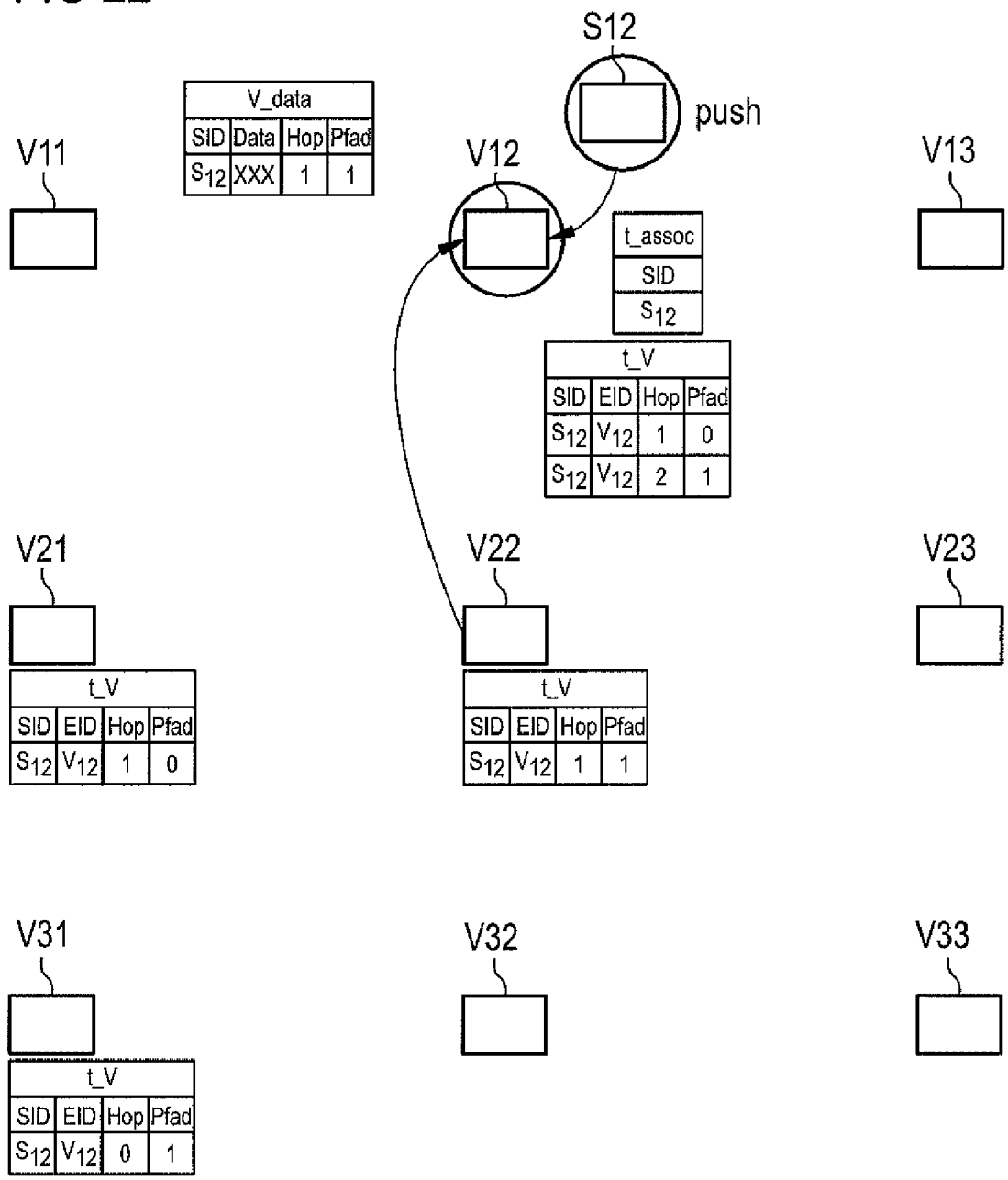

FIG. 22 shows a deletion process with which the switching paths of the wireless network fixed by an initialization method and also the allocation of the transmitter node S12 to the receiver and destination node V12 fixed by the initialization method are deleted. For this purpose, the destination and switching node V12 and the transmitter node S12 are brought toward each other, and a push button that triggers a delete signal is activated on the transmitter node S12. After the delete button is pressed, the allocation of the destination node V12 to the transmitter node S12 is deleted and forwarded to all switching nodes in the network. This deletion information then causes all of the allocation information and switching information to be deleted in all of the switching nodes involved in the set switching paths.

Figure 23:
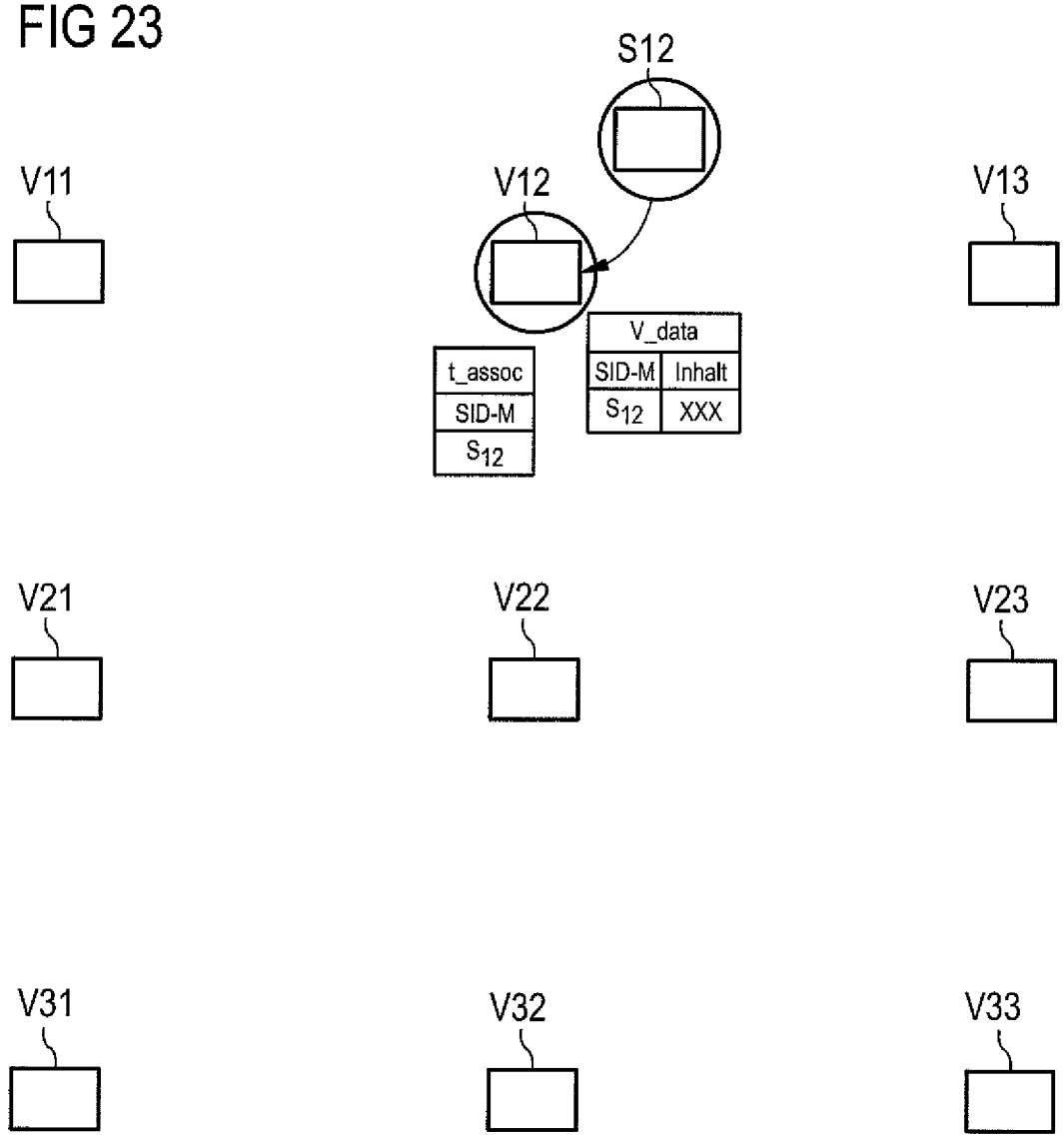
Figure 24:
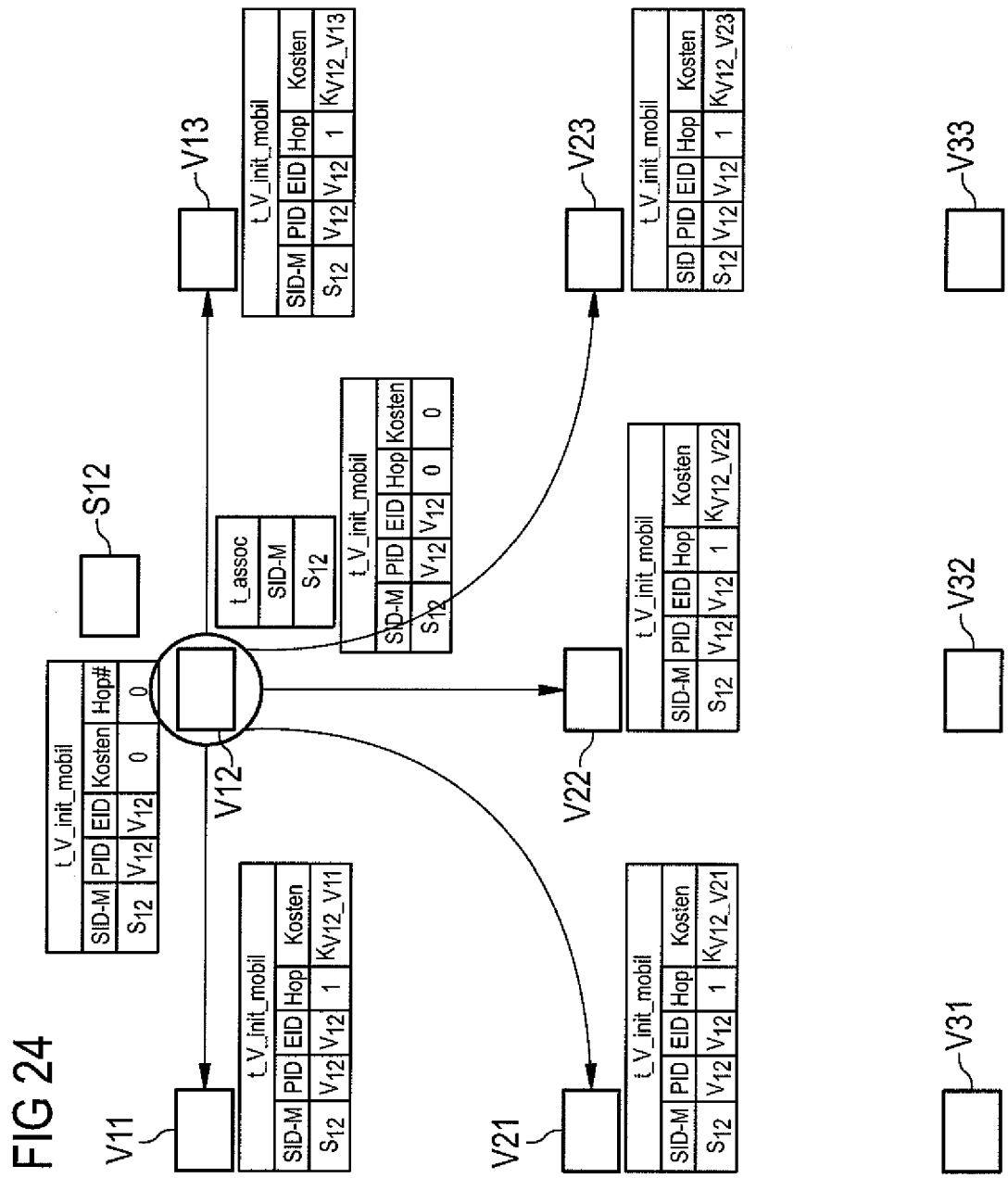
Figure 25:
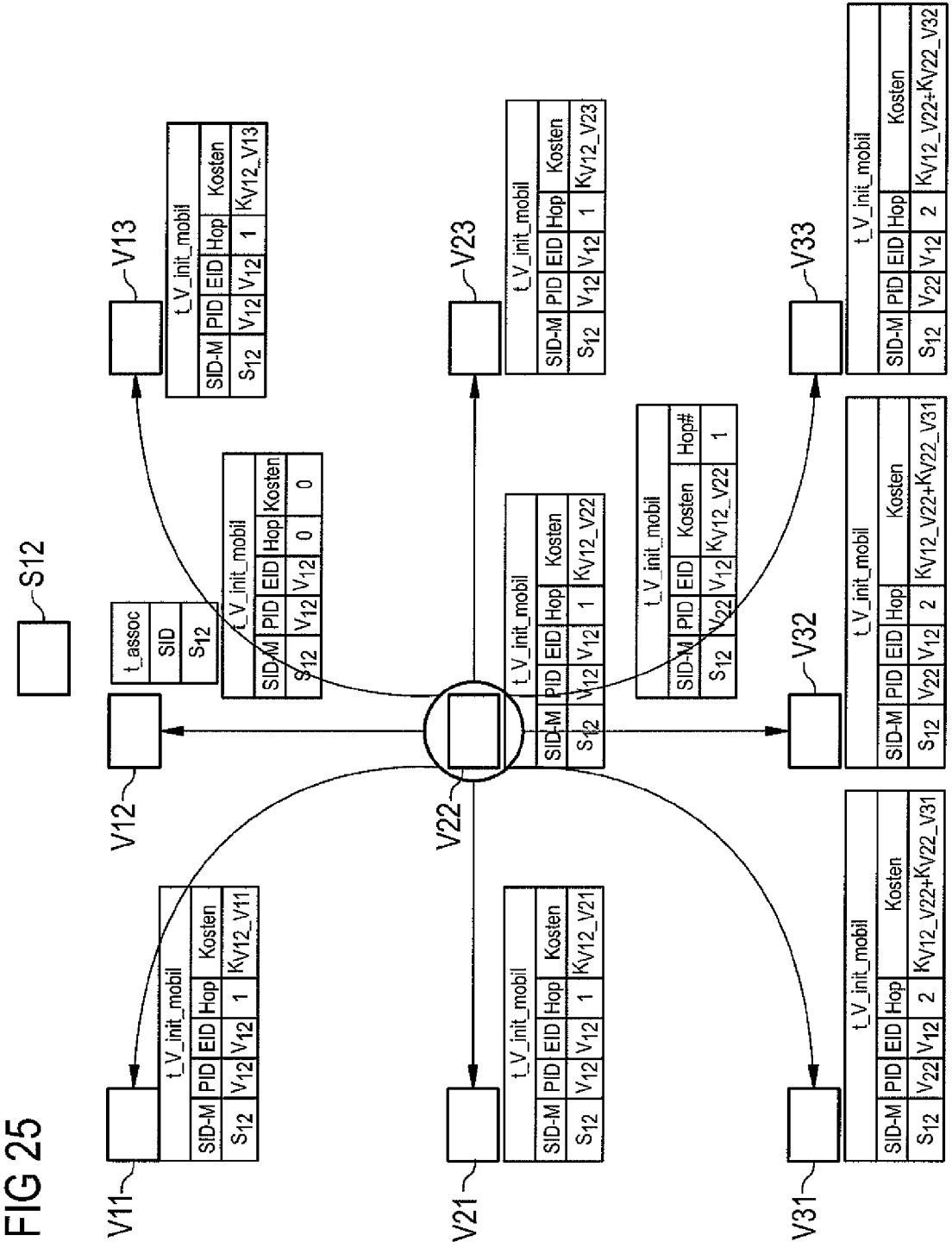

Below, the initialization method is described for a mobile transmitter node S12. FIG. 23 shows the process already described above for the beginning of the initialization method in which the transmitter node S12 is brought into the immediate vicinity of the switching node V12. At the switching node V12, the learning of "a mobile transmitter node" is triggered and, at the transmitter node S12, a push button is activated that triggers the transmission of the registration information on the mobile transmitter node. The registration information includes the transmitter identification of the mobile transmitter node SID-M. The registration information of the mobile transmitter node SID-M is similarly distributed like in a non-mobile transmitter node S12 according to a tree structure to all of the switching nodes V11 to V33 in the wireless network. FIG. 24 shows a first step of this distribution to the switching node V11, V13, V21, V22, and V23. Each of these switching nodes receives information on the allocation of the transmitter node to the destination node V12. Using the example of the switching node V22 shown in FIG. 25, this information is forwarded to all of the adjacent switching nodes V31, V32, and V33, wherein the previous switching nodes V21, V11, V12, V13, and V23 also receive this information as reception confirmation.

Figure 26:
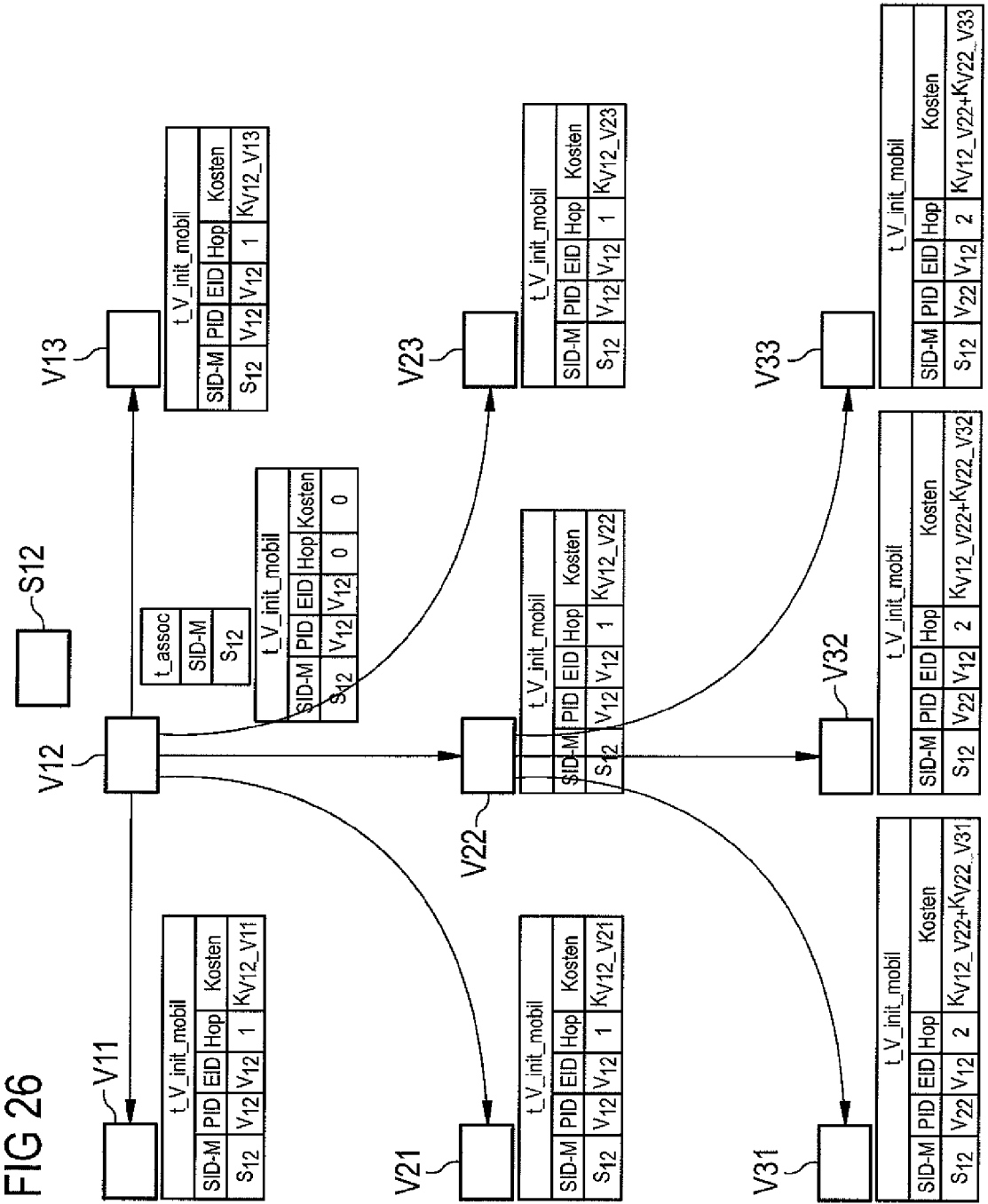

In this way, after two example wireless steps, the status shown in FIG. 26 is reached. Each switching node in the network has stored the switching information according to the tree-like structure already described in connection with the initialization method with a non-mobile transmitter node. The tree-like structure has its root in the destination node, the switching node V12. This information is stored in each switching node of the network in a unique memory location of the memory.

Figure 27:
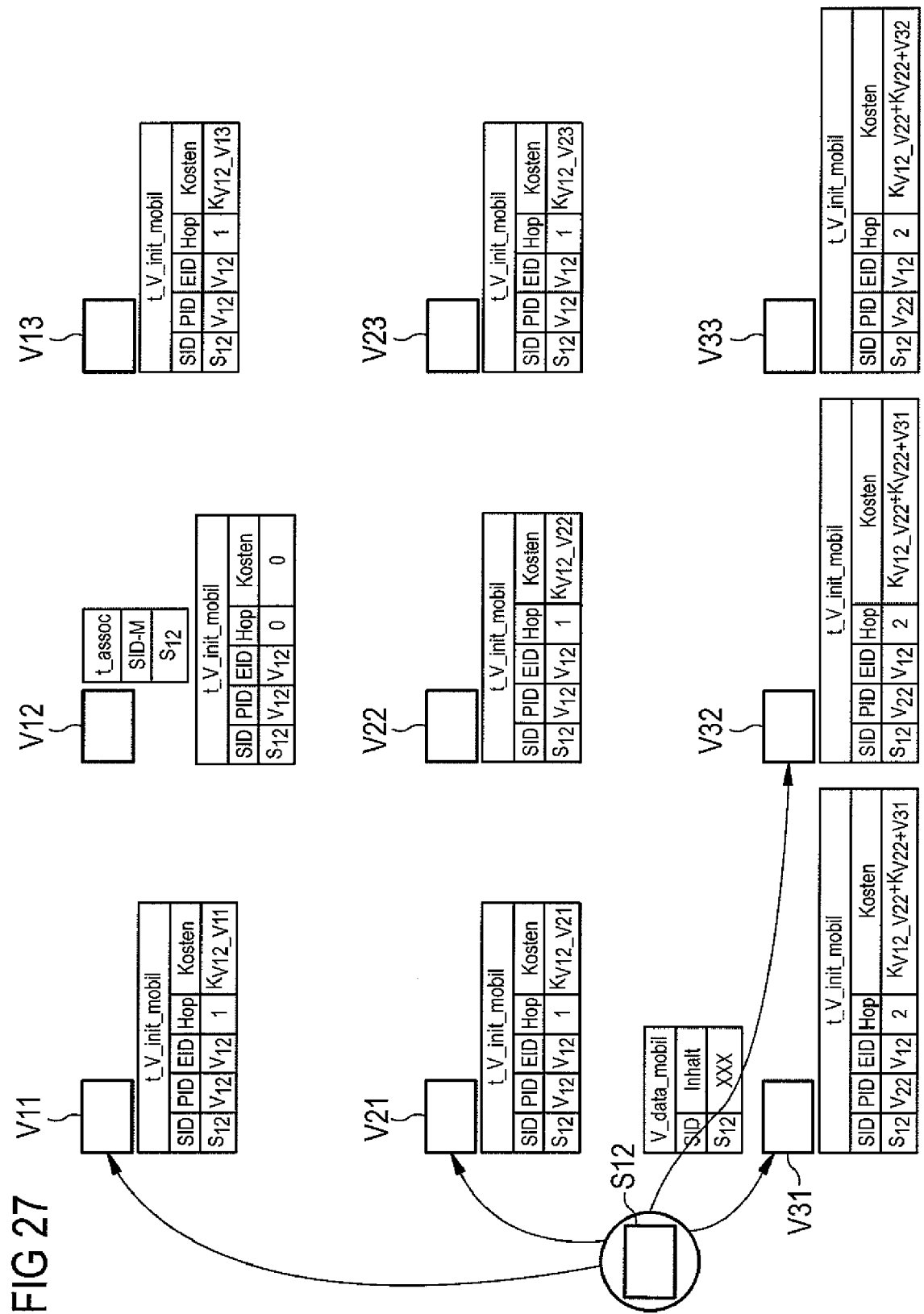

Now, as shown in FIG. 27, if the mobile transmitter node S12 moves in the network and transmits a wireless message, then, initially, each of the switching nodes V11, V21, V31, and V32 located within the range of the mobile transmitter node V12 receives this message and forwards it along the tree structure in the wireless network to the destination node V12. If four switching nodes now receive this information, then, these four switching nodes each forward the information to the destination node V12 with reference to the tree structure shown in FIG. 26. That is, mobile transmitter nodes in the wireless network cause a large amount of wireless traffic. For this reason, it is advantageous to limit the number of mobile transmitter nodes in the wireless network to a meaningful measure or to a meaningful number.

In other embodiments (not shown) of the wireless network, a switching or receiver node can transmit an acknowledgment, for example, in the form of an acknowledge signal, to the corresponding transmitter node. This is useful, for example, for the transmission of sensor values between a sensor as the transmitter node and a control module as the receiver node. A switching node functions as a repeater that amplifies the transmitted signal such that it could be transmitted across greater distances from the transmitter node to the receiver node. If the transmitter node operates in an energy self-sufficient way, then it is desirable that the transmitter node consumes as little energy as possible. Advantageously, the transmitter node therefore requests a mentioned acknowledge signal in only a very short time interval. Time delays through a switching node as a repeater could therefore by bypassed, in that the switching node has a buffer memory for acknowledge signals of the receiver node. Then, if the transmitter node requests an acknowledge signal, this can be sent to it from the buffer memory of the closest switching node.

Such a buffer memory can also be provided in a receiver node itself. Furthermore, a switching node could send information with respect to the transmission power to a receiver node, so that the receiver node could decide which node will perform the buffering of the acknowledge signals.

Furthermore, an initialization phase or learning phase could be performed such that, through activation of a button on a receiver module of a receiver node, this phase is started and, through activation of a button on a transmitter module in the transmitter node, the transmission of a message from the transmitter node to the receiver node is triggered. Thus, a receiver node receives automated information on the corresponding transmitter node. This can then be acknowledged by the receiver node. In this way, transmitter and receiver functions could be realized by means of corresponding microcontroller components.

Possible applications and realizations for all of the processing steps named above could be, for example, the temperature regulation by temperature sensors in rooms of buildings, wherein these sensors automatically transmit sensor values to a central regulation and control component. Another application is given for houses in which various kinds of decentralized sensor components for ventilation systems, blinds, window sensors, light switches, or the like are connected in a wireless network to central control components and communicate with each other wirelessly.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An initialization method for a wireless network with at least one receiver node and/or switching node and transmitter node, wherein one transmitter node is allocated to at least one receiver node, the method comprising the steps of:
    registration of the transmitter node on the receiver node with generation of allocation information;
    propagation of the allocation information generated in the registration process to all switching nodes and/or receiver nodes of the wireless network; and
    storage of the allocation information to all switching nodes and/or receiver nodes of the network,
    wherein at least one of the switching node and the transmitter node are operated in an energy self-sufficient way with ambient energy.

2. The initialization method according to claim 1, wherein path information is allocated to each set of allocation information and is stored at the receiver node and/or at the switching node.

3. The initialization method according to claim 2, wherein
    the transmitter node is brought to a defined location after registration on the receiver node;
    a wireless message is triggered on the transmitter node at the defined location;
    the wireless message is switched by means of switching nodes to the receiver node;
    the wireless message is received at the receiver node and at least one switching path is defined;
    path information of the defined switching path is transmitted to the switching node involved in the switching path; and
    the path information of the switching path is stored at the switching nodes involved in the switching path.

4. The initialization method according to claim 1, wherein with the reception of the allocation information, all of the switching nodes of the wireless network are set to an initialization state.

5. The initialization method according to claim 4, wherein the initialization state on the switching node is ended after the reception of the path information of the optimal switching path.

6. The initialization method according to claim 1, wherein the allocation information generated in the registration process is propagated to the switching nodes according to a tree structure that has its root at the receiver node.

7. The initialization method according to claim 6, wherein the switching of the wireless message is realized via the switching nodes to the receiver nodes according to the tree structure.

8. The initialization method according to claim 1, wherein the receiver node evaluates the wireless messages received across a preset time period, and from this, at least one first and one second optimal switching path are determined.

9. The initialization method according to claim 8, wherein the receiver node transmits the path information of the first and second optimal switching paths to the switching nodes and the path information of the optimal switching paths is stored at the switching nodes involved in the optimal switching paths.

10. The initialization method according to claim 1, wherein the registration process of the transmitter node on the receiver node takes place by means of a wireless transmission of a transmitter identification from the transmitter node to the receiver node.

11. The initialization method according to claim 10, wherein
    the allocation information comprises the transmitter identification and receiver identification.

12. The initialization method according to claim 10, wherein
    the transmitter identification is stored on the receiver node.

13. The initialization method according to claim 10, wherein the wireless message of the transmitter node comprises at least the transmitter identification, and the method comprises the steps of:
    reception of the wireless message comprising a switching node identification at one or more switching nodes;

comparison of the transmitter identification with the stored allocation information;

if the transmitter identification matches the allocation information, addition of the switching node identification to the wireless message; and transmission of the expanded wireless message by the switching node.

14. The initialization method according to claim 1, wherein the registration process of the transmitter node on the receiver node takes place in the immediate vicinity of the receiver node.

15. The initialization method according to claim 1, wherein the optimal switching path on the receiver node is set by a selection according to a cost analysis of the incoming wireless messages.

16. The initialization method according to claim 1, wherein the receiver node transmits a switching reply.

17. The initialization method according to claim 16, wherein the switching reply comprises:

the allocation information with transmitter identification and receiver identification; and the switching node identification of the preceding switching node of the set switching path.

18. The initialization method according to claim 17, wherein the forwarding of the information of each switching node by the preceding switching node is evaluated as reception confirmation.

19. An operating method for a wireless network with at least one receiver node and/or switching node and transmitter node, wherein at least one allocation between a transmitter node and a receiver node is preset after an initialization method according to claim 1, the method comprising the steps of:

transmission of a wireless message at the transmitter node;

reception of the wireless message at one or more switching nodes; and if the switching node is not the receiver node, transmission of the wireless message at the switching node, and reception of the message at the preset receiver node.

20. The operating method according to claim 19, wherein a transmitter identification of the allocated transmitter node is stored in the receiver node, and a transmitted message comprises the transmitter identification and message contents.

21. The operating method according to claim 19, wherein a switching process is received at a switching node from the preceding switching node and is evaluated by this according to a reception confirmation.

22. An operating method for a wireless network with at least one receiver node and/or switching node and transmitter node comprising the steps of:

transmitting a wireless message at the transmitter node;

receiving the wireless message at one or more switching nodes;

if the switching node is not the receiver node, transmitting of the wireless message at the switching node;

receiving the message at the preset receiver node;

transmitting an acknowledge signal for acknowledging the received wireless message from the receiver node to one or more switching nodes;

storing the acknowledge signal in a buffer memory of the switching node: and transmitting the buffered acknowledge signal from the switching node to the transmitter node upon request of the transmitter node, wherein at least one of the switching node and the transmitter node are operated in an energy self-sufficient way with ambient energy.

23. An operating method for a wireless network with at least one receiver node and/or switching node and transmitter node comprising the steps of:

transmitting a wireless message at the transmitter node;

receiving the wireless message at one or more switching nodes;

if the switching node is not the receiver node, transmitting the wireless message at the switching node;

receiving the message at the preset receiver node;

transmitting a reply signal from the receiver node to one or more switching nodes;

storing the reply signal in a buffer memory of the switching node; and transmitting the buffered reply signal from the switching node to the transmitter node upon request of the transmitter node, wherein at least one of the switching node and the transmitter node are operated in an energy self-sufficient way with ambient energy.

* * * * *

UNITED STATES PATENT AND TRADEMARK OFFICE
CERTIFICATE OF CORRECTION

PATENT NO. : 8,391,903 B2  
APPLICATION NO. : 12/497526  
DATED : March 5, 2013  
INVENTOR(S) : Jose Lopez De Arroyabe et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 400 days.

Signed and Sealed this
Thirtieth Day of December, 2014

Michelle K. Lee
*Deputy Director of the United States Patent and Trademark Office*